United States Patent
Yamamura

(10) Patent No.: US 8,675,281 B2
(45) Date of Patent: Mar. 18, 2014

(54) LENS UNIT, LED HEAD, EXPOSURE DEVICE, IMAGE FORMING DEVICE, AND SCANNING DEVICE

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 107 days.

(21) Appl. No.: 13/479,325

(22) Filed: May 24, 2012

(65) Prior Publication Data

US 2012/0300308 A1 Nov. 29, 2012

(30) Foreign Application Priority Data

May 26, 2011 (JP) .................................. 2011-118218

(51) Int. Cl.
*G02B 27/10* (2006.01)
*G02B 3/00* (2006.01)

(52) U.S. Cl.
CPC .................................... *G02B 3/0056* (2013.01)
USPC ............................ 359/619; 359/624; 359/626

(58) Field of Classification Search
USPC .................................. 359/619, 621–624, 626
See application file for complete search history.

(56) References Cited

FOREIGN PATENT DOCUMENTS

JP 2008-083576 A 4/2008

*Primary Examiner* — Jack Dinh
(74) *Attorney, Agent, or Firm* — Panitch Schwarze Belisario & Nadel LLP

(57) ABSTRACT

A lens unit includes first and second arrays of microlenses. The microlenses in the first array have mutually parallel optical axes and are aligned in a meridional direction orthogonal to their optical axes. The microlenses in the second array are aligned in the same direction as the lenses in the first array, and have optical axes that coincide with the optical axes of corresponding microlenses in the first array. The microlenses in the first array collimate light incident in a sagittal plane orthogonal to the meridional direction. The microlenses in the second array focus the collimated light in the sagittal plane. The lens unit is useful in the scanning heads of scanning devices, the LED heads of LED printers, and in the exposure devices of other electrophotographic image forming apparatus.

20 Claims, 25 Drawing Sheets

LENS UNIT, LED HEAD, EXPOSURE DEVICE, IMAGE FORMING DEVICE, AND SCANNING DEVICE

BACKGROUND OF THE INVENTION

1. Field of the Invention

The present invention relates to a lens unit and to devices employing the lens unit to form or scan images.

2. Description of the Related Art

Optical systems having linear arrays of optical elements that form erect images with one-to-one magnification are used in various image forming and image scanning devices incorporating arrays of light-emitting or light-sensing elements. Exemplary devices include electrophotographic printers with arrays of light-emitting diodes (LEDs) and image scanners with optical line sensors. Japanese Patent Application Publication No. 2008-83576 proposes an array of paired microlenses for use in this type of optical system.

In both image forming devices and image scanning devices, there is a need for optical systems with improved optical efficiency. In the optical exposure devices or 'heads' of electrophotographic printers, for example, to increase the resolution of the printed image, the light-emitting elements must be packed densely together. Their size is consequently reduced, with a corresponding reduction in emitted light. The optical efficiency of the optical system must be increased in compensation so that a bright image can be formed despite the reduced amount of light. In scanning devices, the optical efficiency of the optical system needs to be improved to reduce power consumption by the light source that illuminates the document or other subject copy being scanned.

SUMMARY OF THE INVENTION

An object of the present invention is to provide an optically efficient optical system for use in an image scanning device or image forming device.

The invention provides a lens unit having a first lens array and a second lens array, both arrays extending in a first direction. The optical axes of the lenses in the first lens array are mutually parallel, and extend in a second direction orthogonal to the first direction. The first and second directions are both orthogonal to a third direction. The optical axes of the lenses in the second lens array coincide with the optical axes of corresponding lenses in the first lens array.

The first and second lens arrays form a plurality of pairs of lenses including a first lens in the first lens array and a second lens, having the same optical axis, in the second lens array. In each of the plurality of pairs of lenses the first lens collimates light rays incident from an object plane that propagate in a first plane parallel to the third direction and including the optical axes of the first and second lenses, and the second lens focuses the collimated light rays onto an image plane.

DETAILED DESCRIPTION OF THE INVENTION

Figure 1:
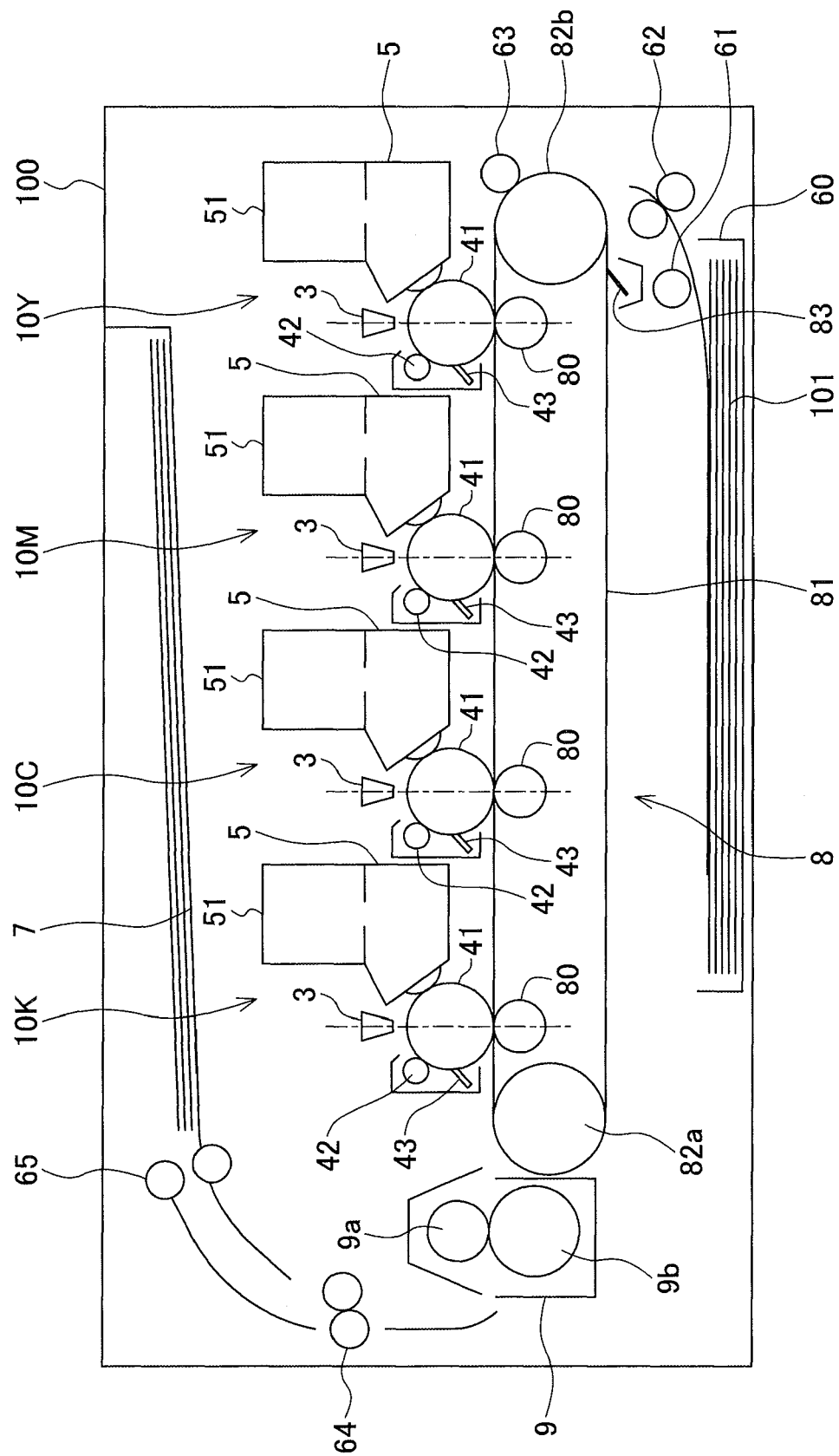
FIG. 1 is a schematic sectional view of an electrophotographic printer used as an image forming device in a first embodiment of the invention.

Embodiments of the invention will now be described with reference to the attached drawings, in which like elements are indicated by like reference characters.

First Embodiment

The first embodiment is an image forming device with a novel lens unit.

Referring to FIG. 1, the first embodiment is an electrophotographic printer 100 that uses exposure devices to form latent electrostatic images according to supplied image data, develops the images with developing agents, and then forms a combined-image on a printing medium. The developing agents are, for example, resin-based toners including colored dyes.

The exemplary printer 100 in FIG. 1 is a tandem full color electrophotographic printer with image forming units 10Y, 10M, 10C, 10K that form yellow, magenta, cyan, and black images, respectively. The image forming units 10Y, 10M, 100, 10K are disposed on the transport path of the printing medium or paper 101. For simplicity, the image forming units 10Y, 10M, 10C, 10K will be referred to below as the image forming units 10.

Each of the image forming units 10 has a photosensitive drum 41 as an image carrier. An LED head 3, a developer unit 5, a charging roller 42, and a cleaning blade 43 are arranged around the photosensitive drum 41. The charging roller 42 supplies charge to and thereby charges the surface of the photosensitive drum 41. The LED head 3, functioning as the exposure unit and operating according to the image data, selectively illuminates the surface of the photosensitive drum 41 to form a latent electrostatic image. The developer unit 5 develops the latent electrostatic image by applying toner, thereby forming a toner image on the photosensitive drum 41. The toner is supplied from a toner cartridge 51. The cleaning blade 43 makes contact with the photosensitive drum 41 and removes residual toner after the toner image is transferred to the paper 101.

The paper 101 is taken from a paper cassette 60 by a hopping roller 61 and fed toward the image forming units 10 by transport rollers 62, 63.

The printer 100 also has a transfer belt unit 8 and transfer rollers 80. In the transfer belt unit 8, a transfer belt 81 is looped around a driven roller 82a and a non-driven roller 82b. When roller 82a is driven, the transfer belt 81 carries the paper 101 between the image forming units 10 and the corresponding transfer rollers 80 to receive the toner images from the photosensitive drums 41. The transfer belt 81 is cleaned by a transfer belt cleaner 83.

The printer 100 also has a fuser unit 9 including a pair of rollers (e.g., a heating roller and a pressure roller) 9a, 9b that fuse the toner images onto the paper 101 by heat and pressure. A pair of transport rollers 64 then feed the paper 101 to a delivery roller 65. The delivery roller 65 delivers the paper 101 with the fused images onto a stacking tray 7 in which printed pages are stacked.

The printer 100 also includes a drive mechanism, power source, communication interface, and control unit, which are not shown in the drawing. The drive mechanism includes motors and gears that drive the photosensitive drums 41, transfer belt 81, and various of the rollers. The power source is connected to the motors in the drive mechanism and to the charging rollers 42, LED heads 3, developer units 5, transfer rollers 80, and fuser unit 9, and supplies predetermined voltages to the charging rollers 42 and transfer rollers 80. The communication interface receives the image data (print data) from an external device (not shown). The control unit is connected to the developer units 5, LED heads 3, fuser unit 9, and motors and controls the printer 100 as a whole.

Next the exposure devices or LED heads 3 in the first embodiment will be described.

Figure 2:
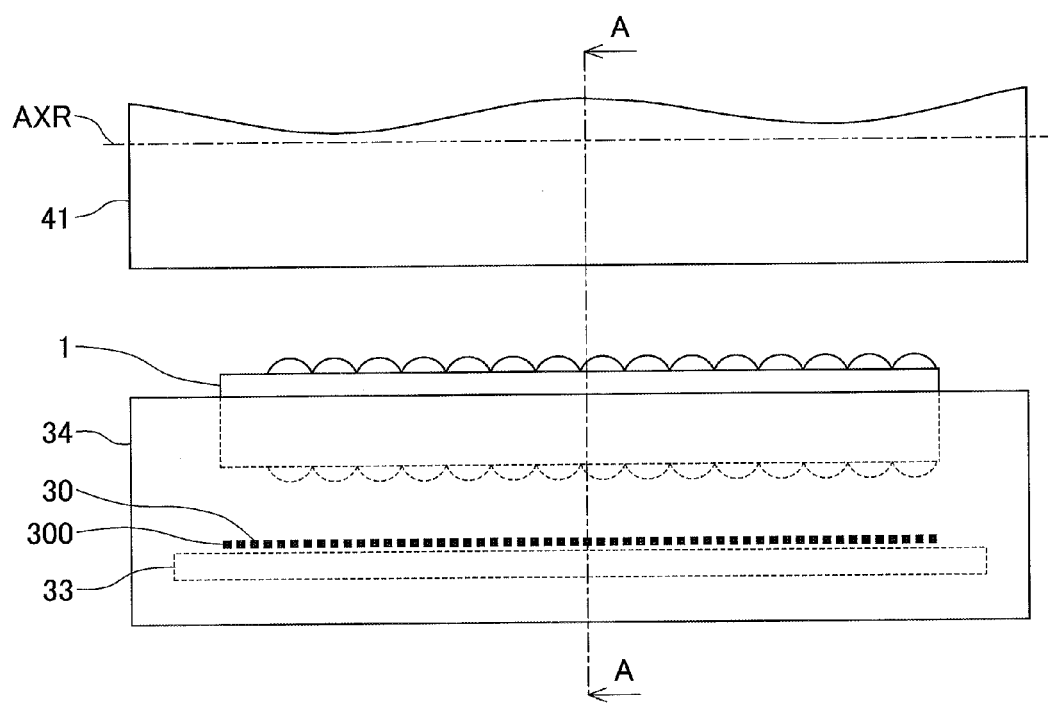
FIG. 2 is a schematic view of an LED head used as an exposure device in the first embodiment.
Figure 2:
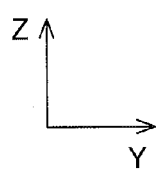

Referring to FIG. 2, each LED head 3 includes a light emitting array, more specifically an LED array 300 having a plurality of light emitting elements (LEDs 30) arranged in a substantially straight row. The LED head 3 also includes a wiring board 33 on which the LED array 300 is mounted, a lens unit 1 that faces the LED array 300, and a holder 34 for holding the lens unit 1.

The row of LEDs 30 extends in a first direction indicated in the drawings as the Y direction; this is the longitudinal direction of the LED array 300. The lens unit 1 has an elongate shape and its longitudinal direction also extends in the first direction or Y direction, paralleling the LED array 300 and the rotational axis AXR of the photosensitive drum 41. The optical axis of each microlens in the lens unit 1 extends in a second direction indicated in the drawings as the Z direction. The Z direction is orthogonal to the Y direction.

Figure 3:
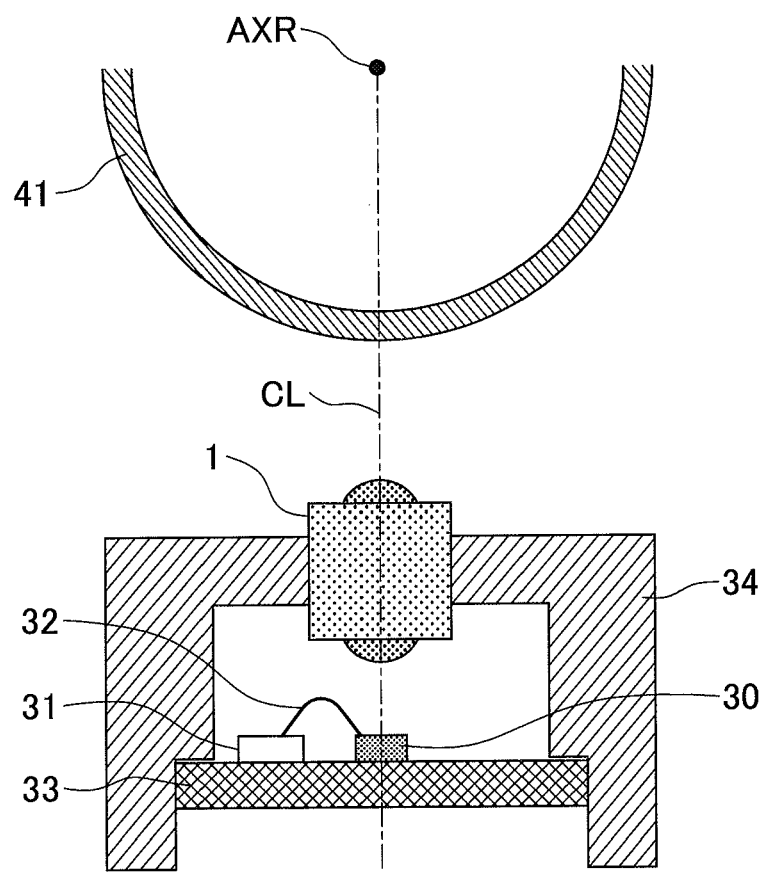
FIG. 3 shows sectional view of the LED head in the first embodiment.

FIG. 3 shows a sectional view of the LED head 3 along line A-A in FIG. 2. The LEDs 30 are centered within the lens unit 1 with respect to a third direction indicated in the drawings as the X direction. The X direction is orthogonal to the Y and Z directions. The line parallel to the Z direction and passing through the center of the lens unit 1 in the X direction is represented by a center line CL, which intersects the LED 30 and the rotational axis of the photosensitive drum 41. The LEDs 30 are driven by driver integrated circuits (ICs) 31 mounted on the wiring board 33, which is supported by the holder 34. The LEDs 30 and their driver ICs 31 are interconnected by wires 32.

In an exemplary LED head 3 having a resolution of 1200 dots per inch (dpi), the LED array 300 has 1200 LEDs per inch. Since an inch is approximately 25.4 millimeters (mm), the spacing between the LEDs 30, or the dot pitch, is substantially 0.02117 mm.

Figure 4:
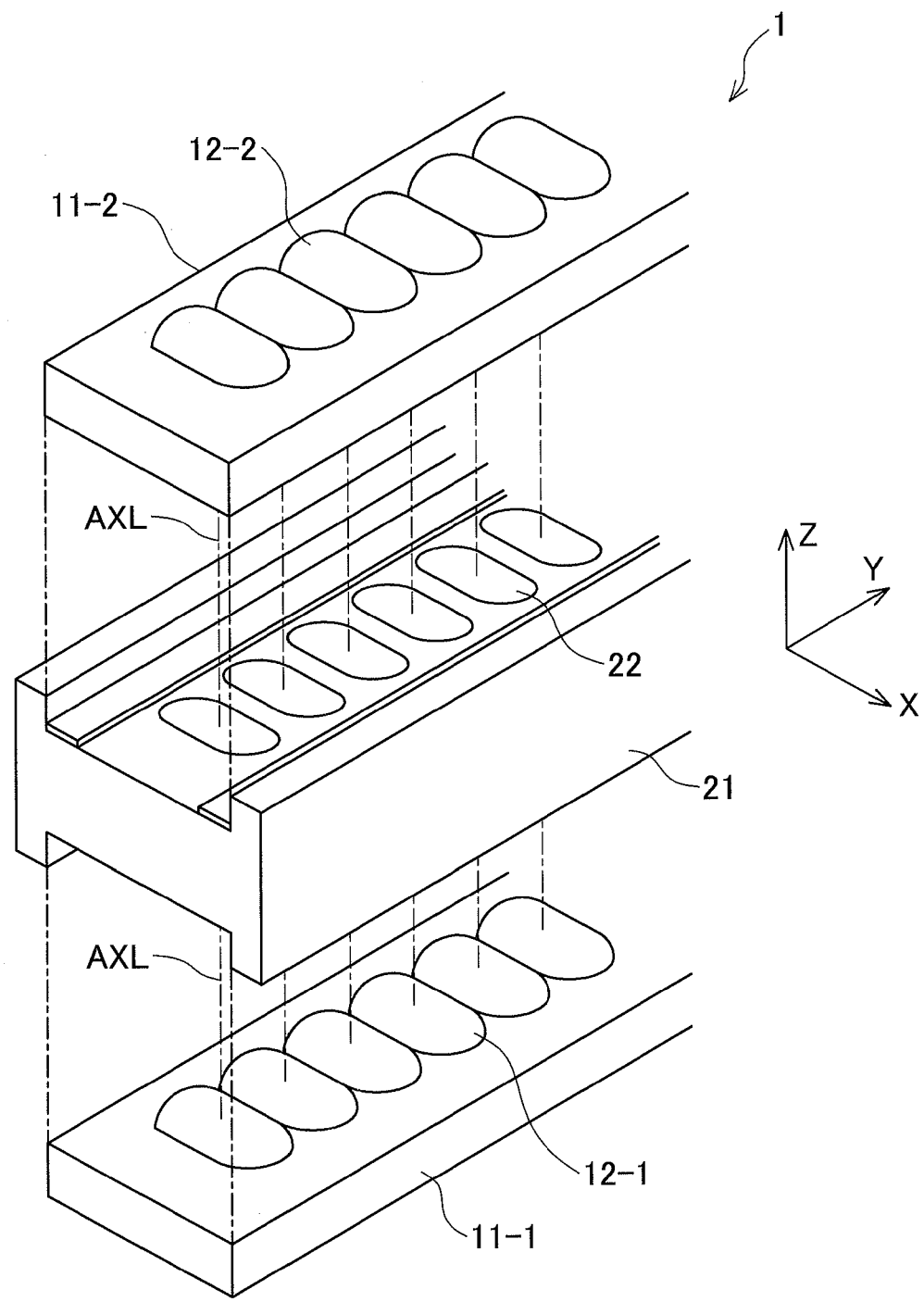
FIG. 4 is an exploded perspective view of the lens unit in the first embodiment.

Referring to FIG. 4, the lens unit 1 includes mutually facing first and second lens strips 11-1, 11-2. The first lens strip 11-1 also faces an object plane disposed at the surfaces of the LEDs 30 in FIG. 3. The second lens strip 11-2 also faces an image plane tangent to the surface of the photosensitive drum 41 in FIG. 3.

The first lens strip 11-1 in FIG. 4 includes an array of first microlenses 12-1 with mutually parallel optical axes AXL extending in the Z direction. The first microlenses 12-1 are arranged in a substantially straight row extending in the Y direction, orthogonal to the optical axes of the first microlenses 12-1.

The second lens strip 11-2 includes an array of second microlenses 12-2, which correspond pairwise (one-to-one) to the first microlenses 12-1. Each paired first microlens 12-1 and second microlens 12-2 have the same optical axis AXL. The second microlenses 12-2 are arranged in a substantially straight row in the first direction or Y direction. The first microlenses 12-1 and the second microlenses 12-2 have the same array spacing.

The lens unit 1 also includes a stop strip 21 interposed between the first and second lens strips 11-1, 11-2. The stop strip 21 is a stop member that limits light incident on the second lens strip 11-2 from the direction of the first lens strip 11-1. The stop strip 21 has a plurality of apertures 22, which are aligned in the Y direction and allow light from the first microlenses 12-1 to pass through to the corresponding second microlenses 12-2. The apertures 22 have the same spacing as the first microlenses 12-1 and second microlenses 12-2 and are aligned in positions such that the optical axes AXL of the corresponding microlenses pass through the apertures 22.

In the lens unit 1, accordingly, a plurality of lens groups, each including a pair of microlenses with mutually coincident optical axes and an aperture, are arranged in a substantially straight row in a direction orthogonal to the optical axes.

Figure 5:
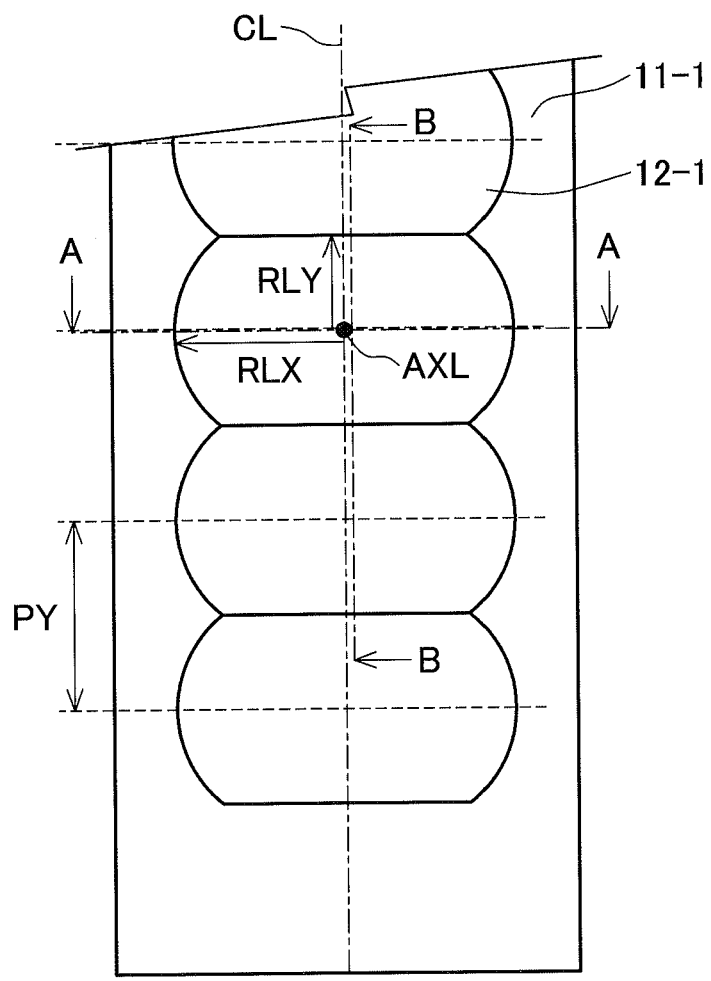
FIG. 5 is a plan view of the first lens array in the first embodiment.

Referring to the plan view in FIG. 5, the first microlenses 12-1 in the first lens strip 11-1 are equally spaced with an array spacing or pitch PY. Each first microlens 12-1 is wider in the X direction than in the Y direction. In this embodiment, the shape of each first microlens 12-1 in the XY plane is a circle of radius RLX truncated by two parallel lines at distances RLY (<RLX) from the center of the circle. The first microlens 12-1 is RLX×2 wide in the X direction and RLY×2 long in the Y direction. As a specific example, RLX may be 1.5 mm and RLY may be 0.5 mm, making the width in the X direction three times the length in the Y direction.

The optical axis AXL of each first microlens 12-1 is substantially centered in the width direction or X direction of the first lens strip 11-1. The optical axes of the first microlenses 12-1 are positioned so that they intersect a center line CL extending in the Y direction through the center of the first lens strip 11-1 as measured in the X direction.

Adjacent first microlenses 12-1 are in mutual contact with no intervening gap. Therefore, the half length RLY of the first microlens 12-1 can be expressed as follows:

$RLY = PY/2$ where PY is the array spacing or pitch of the first microlenses 12-1.

The second lens strip 11-2 has the same structure as the first lens strip 11-1 with the first microlenses 12-1 replaced by second microlenses 12-2.

The first and second lens strips 11-1, 11-2 and the plurality of microlenses are integrally formed by injection molding of a material that transmits the light emitted from the light emitting elements (LEDs 30). An optical resin such as a cycloolefin resin may be used (e.g., ZEONEX E48R, manufactured by Zeon Corporation).

The lens groups have a second plane that includes the optical axes AXL of the microlenses and is parallel to the Y direction; this plane will be referred to as the meridional plane. In this embodiment, the meridional plane is orthogonal to the third direction, and defined by the lines CL in FIGS. 3 and 5. Each lens group has a first plane that includes the optical axis AXL and is parallel to the X direction; this plane will be referred to as the sagittal plane. In this embodiment, the sagittal plane is orthogonal to the Y direction. The Y direction, i.e., the longitudinal direction of the lens unit, will also be referred to as the meridional direction. The X direction, i.e., the width direction of the lens unit, will also be referred to as the sagittal direction.

In each lens group, the first microlens 12-1 and second microlens 12-2 have different sectional shapes in the meridional plane and the sagittal plane. That is, the entrance surfaces of the first and second microlenses 12-1, 12-2, which are the surfaces facing toward the object plane, have different sectional shapes in the meridional and sagittal planes. The exit surfaces of the first and second microlenses 12-1, 12-2, facing toward the image plane, also have different sectional shapes in the meridional and sagittal planes.

Both surfaces of the first and second microlenses 12-1, 12-2 have sectional shapes such that the radius of curvature in the sagittal plane is greater than the radius of curvature in the meridional plane.

The curved entrance and exit surfaces of the first and second microlenses 12-1, 12-2 have shapes that can be expressed by the following equation (1) in a Cartesian coordinate system with X, Y, and Z axes. The Z axis coincides with the optical axis AXL, the direction from the object plane toward the image plane being the positive direction. In the equation, CR represents the radius of curvature, K represents a conic constant, $CP_{n,m}$ is a coefficient of a polynomial expression, and n and m are positive integers.

$$Z(X, Y) = \frac{\frac{X^2 + Y^2}{CR}}{1 + \sqrt{1 - (1+K)\frac{X^2 + Y^2}{CR^2}}} + \sum CP_{n,m} X^n Y^m \quad (1)$$

Both surfaces of the first and second microlenses 12-1, 12-2 are symmetrical with respect to the meridional plane and the relevant sagittal plane. The integers m and n in the equation (1) above are even numbers.

Figure 6:
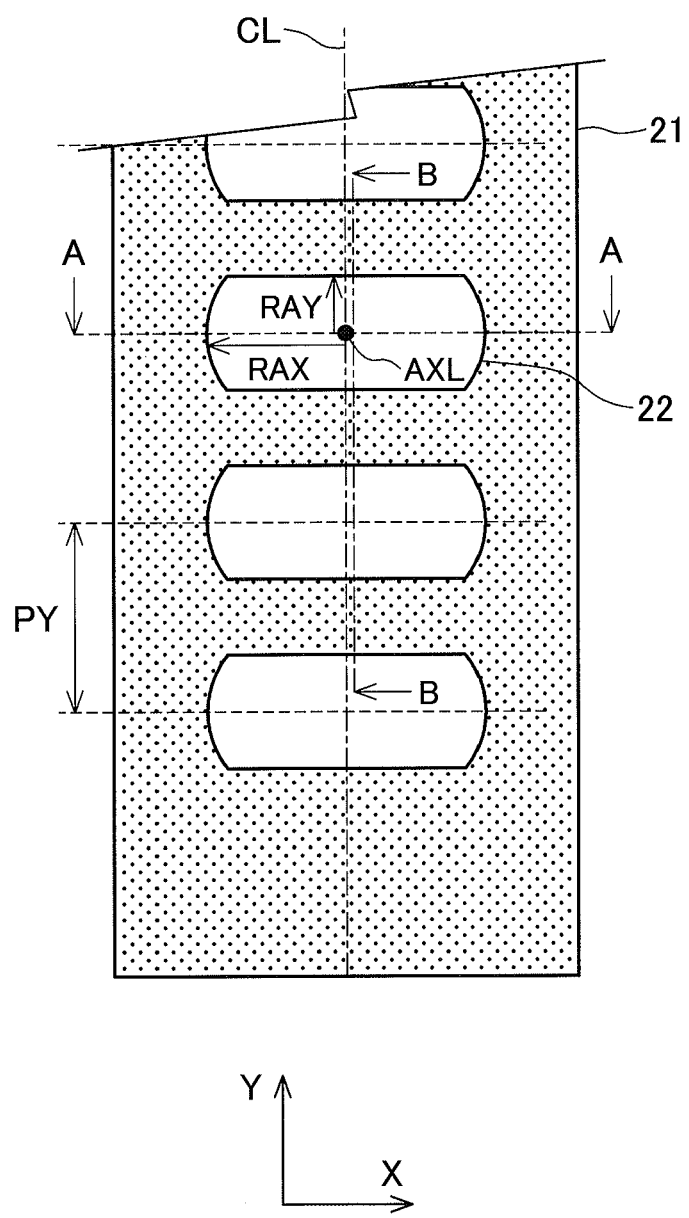
FIG. 6 is a plan view of the stop member in the first embodiment.

FIG. 6 shows a plan view of the apertures 22 in the stop strip 21. The apertures 22 are arranged in a substantially straight row in the Y direction with the same array pitch PY as the first microlenses 12-1 and second microlenses 12-2. In this embodiment, the shape of each aperture 22 in the XY plane is a circle of radius RAX truncated by two parallel lines at distances RAY (<RAX) from the center of the circle. The center of the aperture 22 coincides with the optical axis AXL of the microlenses. The stop strip 21 is formed by injection molding of a material such as polycarbonate that blocks the light emitted by the light emitting elements (LEDs 30).

Figure 7:
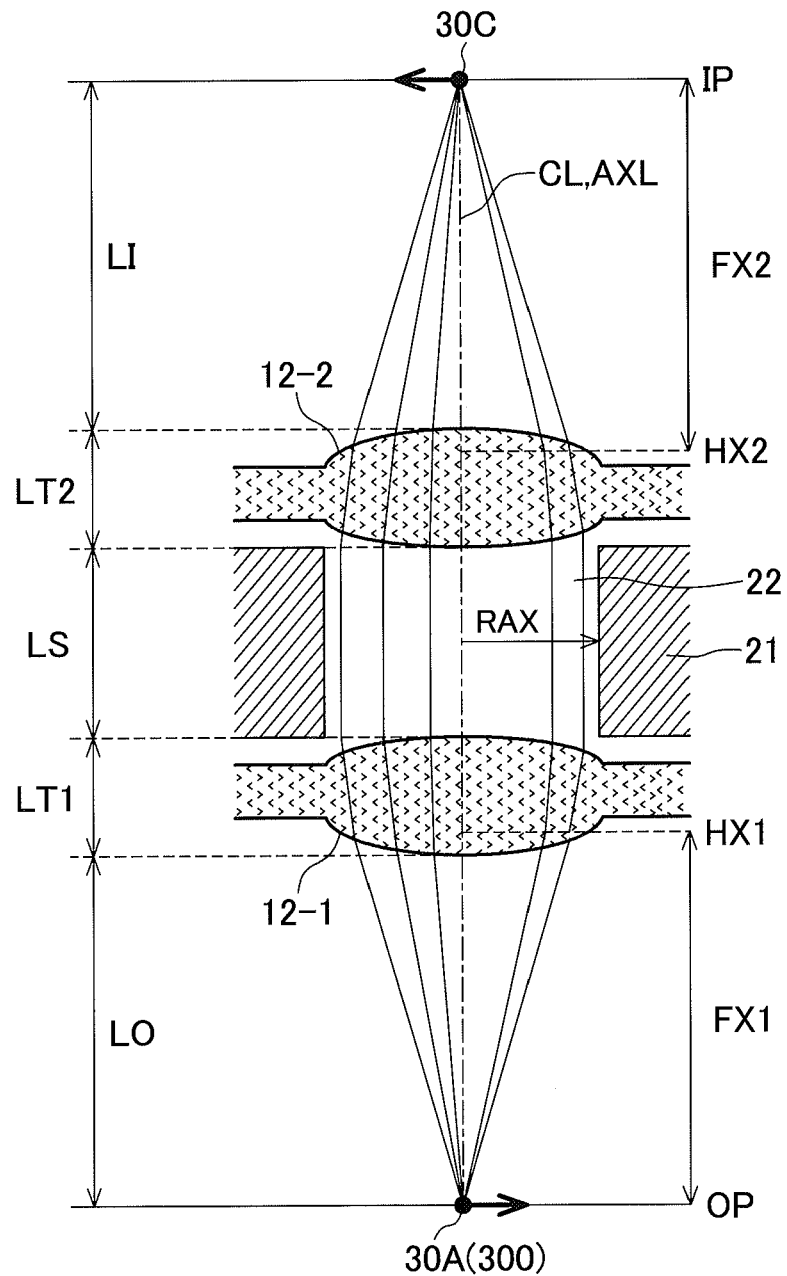
FIG. 7 is a sectional view of the lens unit in the first embodiment in a sagittal plane.

FIG. 7 shows a sectional view of a lens group in the lens unit 1 in the sagittal plane along line A-A in FIGS. 5 and 6, and indicates the object plane OP and image plane IP.

The object 30A imaged by the lens group is disposed in the object plane OP on the Z-direction line CL passing through the center of width of the lens unit 1. In this embodiment the object 30A is an LED in the LED array 300. The first microlens 12-1 is disposed at a distance LO, measured on the optical axis AXL, from the object plane OP. The second microlens 12-2 directly faces the first microlens 12-1 and is separated from the first microlens 12-1 by a distance LS measured on their mutual optical axis AXL. The image plane of the lens group is at a distance LI from the second microlens 12-2, measured on the optical axis AXL. The first microlens 12-1 has a thickness LT1; the second microlens 12-2 has a thickness LT2.

The focal point of a bundle of parallel rays propagating in the sagittal plane will be referred to as the sagittal focal point. The associated principal plane and focal length will be referred to as the sagittal principal plane and sagittal focal length.

The first microlens 12-1 is disposed in a position such that for hypothetical light rays propagating toward the object plane OP, the sagittal focal point coincides with the object 30A in FIG. 7, and the distance from the sagittal principal plane HX1 to the object plane OP equals the sagittal focal length FX1. The second microlens 12-2 is disposed in a position such that for light rays propagating away from the object plane OP, the sagittal focal point coincides with the image 30C formed in the image plane IP and the distance from the sagittal principal plane HX2 to the image plane IP equals the sagittal focal length FX2.

The difference between distance FX1 and distance LO is inversely proportional to the radius of curvature of the curved surface of the first microlens 12-1 facing toward the object plane, and the difference between distance FX2 and distance LI is inversely proportional to the radius of curvature of the curved surface of the second microlens 12-2 facing toward the image plane. In this embodiment, the surface of the first microlens 12-1 facing toward the object plane and the surface of the second microlens 12-2 facing toward the image plane have radii of curvature large enough that the FX1-LO difference and FX2-LI difference can be ignored. Therefore, the sagittal focal length FX1 of the first microlens 12-1 is substantially equal to the distance LO from the microlens to the object plane, and the sagittal focal length FX2 of the second microlens 12-2 is substantially equal to the distance LI from the microlens to the image plane.

The first and second microlenses 12-1, 12-2 may have the same structure, with identical thickness (LT1=LT2) and identical sagittal focal length (FX1=FX2), and the surface of the first microlens 12-1 facing toward the object plane may have the same shape and curvature as the surface of the second microlens 12-2 facing toward the image plane, in which case distance LO equals distance LI.

Figure 8:
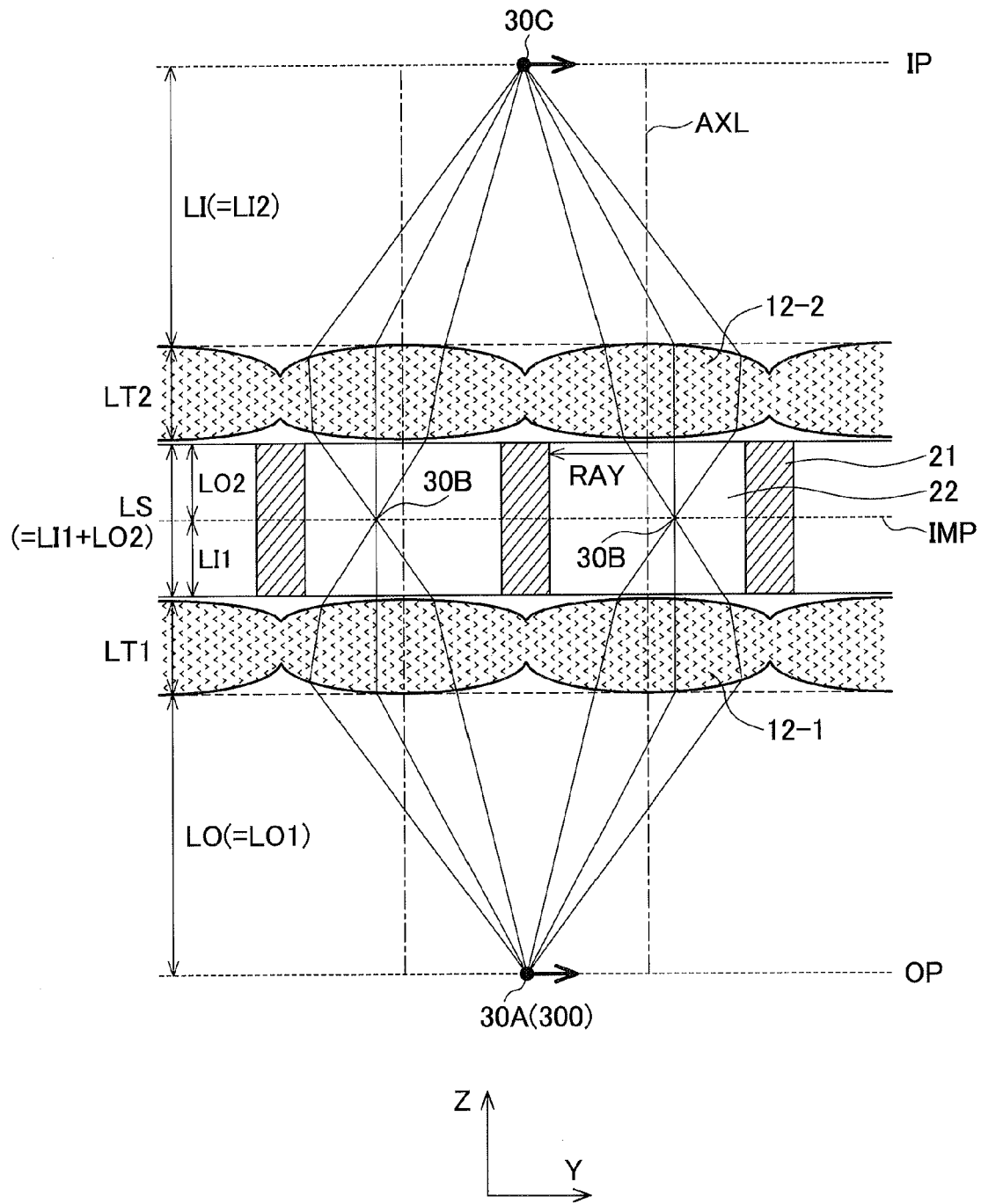
FIGS. 8 and 9 are sectional views of the lens unit in the first embodiment in a meridional plane.

FIG. 8 shows a sectional view of the lens unit 1 in the meridional plane along line B-B in FIGS. 5 and 6, and indicates the object plane OP and image plane IP.

Each first microlens 12-1 focuses light rays in the meridional plane originating from an object 30A (such as an LED in the LED array 300) at a distance LO1 onto a focal point 30B at a distance LI1 in an intermediate image plane IMP. This focal point 30B is at a distance LO2 from the second microlens 12-2. The second microlens 12-2 focuses the meridional light rays diverging from focal point 303 to form an image at a distance LI2. Distances LO1, LI1, LI2, and LO2 are measured in the Z direction, parallel to the optical axes AXL of the lenses.

The distance LO from the object plane OP of the lens unit 1 to the first microlens 12-1 is equal to distance LO1; the spacing LS between the first microlens 12-1 and the second microlens 12-2 is equal to the sum of distances LI1 and LO2; the distance LI from the second microlens 12-2 to the image plane IP of the lens unit 1 is equal to distance LI2.

When the first and second microlenses 12-1, 12-2 have the same structure, distance LO1 equals distance LI2, and distance LI1 equals distance LO2. The spacing LS between the first microlens 12-1 and the second microlens 12-2 is then twice distance LI1 (LS=LI1×2).

Figure 9:
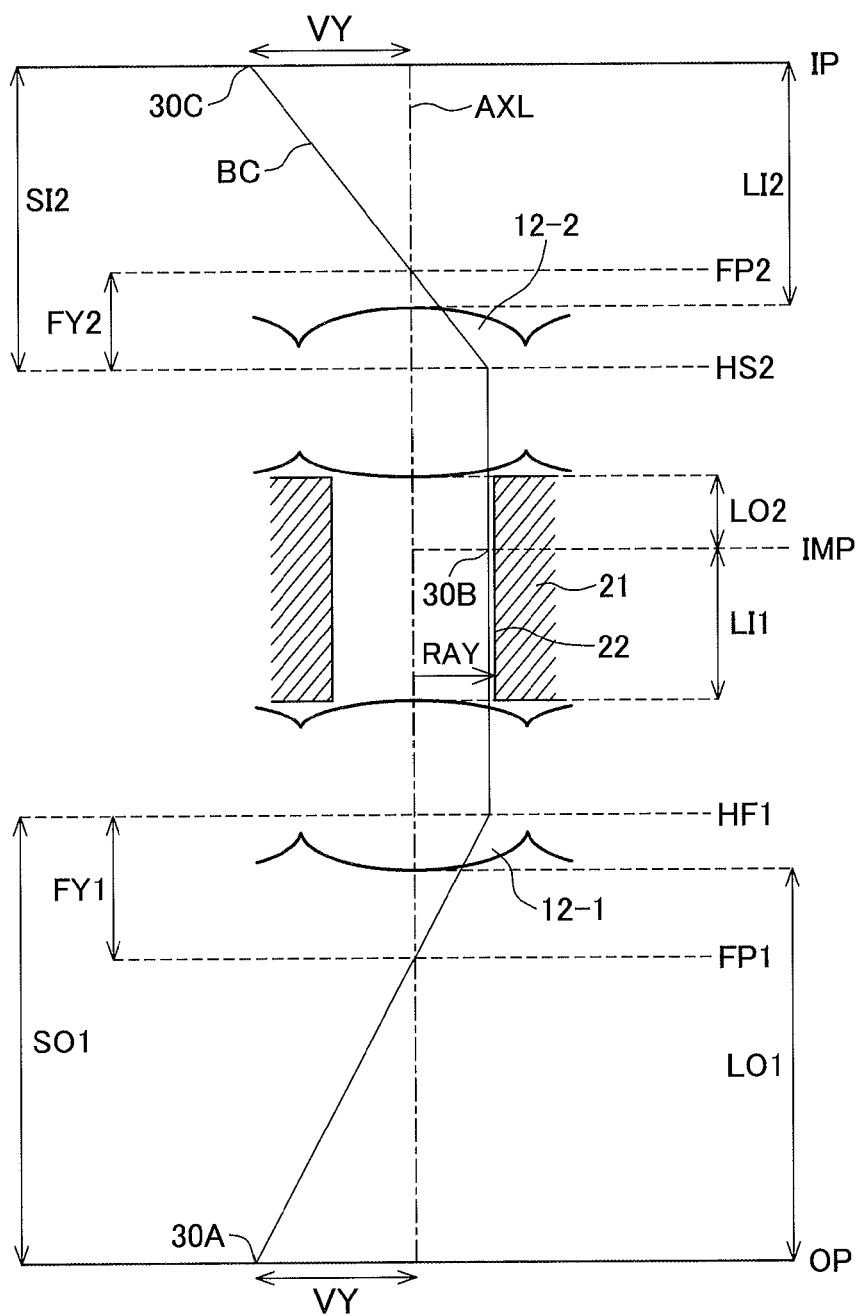

FIG. 9 shows another sectional view of the lens unit 1 in the meridional plane along line B-B in FIGS. 5 and 6, and indicates the object plane OP and image plane IP.

The focal point of a bundle of parallel rays propagating in the meridional plane will be referred to as the meridional focal point. The associated principal plane and focal length will be referred to as the meridional principal plane and meridional focal length.

In FIG. 9, HF1, FP1, and FY1 respectively denote the meridional principal plane, meridional focal plane, and meridional focal length of the first microlens 12-1, and SO1 denotes the distance from the meridional principal plane HF1 to the object plane OP. HS2, FP2, and FY2 respectively denote the meridional principal plane, meridional focal plane, and meridional focal length of the second microlens 12-2, and SI2 denotes the distance from the meridional principal plane HS2 to the image plane IP.

The difference between distance SO1 and distance LO1 is inversely proportional to the radius of curvature of the surface of the first microlens 12-1 facing toward the object plane, and the difference between distance SI2 and distance LI2 is inversely proportional to the radius of curvature of the surface of the second microlens 12-2 facing toward the image plane. In this embodiment, the surface of the first microlens 12-1 facing toward the object plane and the surface of the second microlens 12-2 facing toward the image plane have a radius of curvature large enough that the SO1-LO1 difference and S12-LI2 difference can be ignored.

The meridional focal length FY1 of the first microlens 12-1 is shorter than its sagittal focal length FX1, and the meridional focal length FY2 of the second microlens 12-2 is shorter than its sagittal focal length FX2.

The principal light rays originating from the object plane are parallel to the optical axis AXL between the first microlens 12-1 and second microlens 12-2. Peripheral rays outside the ray BC propagating along the inner wall of the stop strip 21 that defines the aperture 22 are blocked by the stop strip 21. The triangle formed by ray BC, the optical axis AXL, and the object plane OP is similar to the triangle formed by ray BC, the optical axis AXL, and the meridional principal plane HF1. Consequently, the field of view VY of the first microlens 12-1, or the distance from the intersection of the object plane OP and the optical axis AXL to the intersection of the object plane OP and ray BC, is given by the following equation (2).

$$VY = RAY \frac{LO1 - FY1}{FY1} \quad (2)$$

Relations between the array pitch and the field of view VY of the first microlens 12-1 will be described with reference to FIGS. 10A, 10B, and 10C.

Figure 10A:
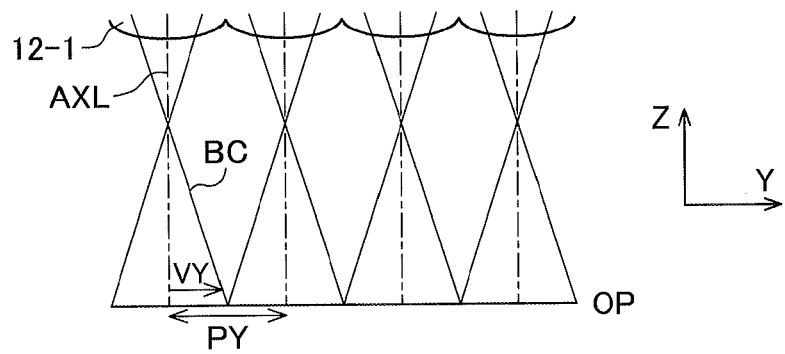
FIGS. 10A, 10B, and 10C illustrate relations between the array pitch and the field of view of the microlenses in the first embodiment.

FIG. 10A shows the minimum field of view VY such that each LED 30 (not shown) in the object plane is in the field of view of at least one microlens and consequently an image of each LED 30 is formed on the photosensitive drum 41. The field of view VY can be expressed in terms of the array pitch PY of the microlenses by the following equation (3).

$$VY = \frac{PY}{2} \quad (3)$$

From equations (2) and (3), the condition on the array pitch PY for forming images of all the LEDs 30 on the photosensitive drum 41 is expressed by equation (4) below, using the meridional focal length FY1, distance LO1, and half-width RAY of the apertures 22 in the Y direction.

$$PY \leq 2RAY \frac{LO1 - FY1}{FY1} \quad (4)$$

By forming an image of each LED 30 with two or more microlenses, the images of all the LEDs 30 can be given substantially the same shape and can be formed with substantially the same amount of light.

Figure 10B:
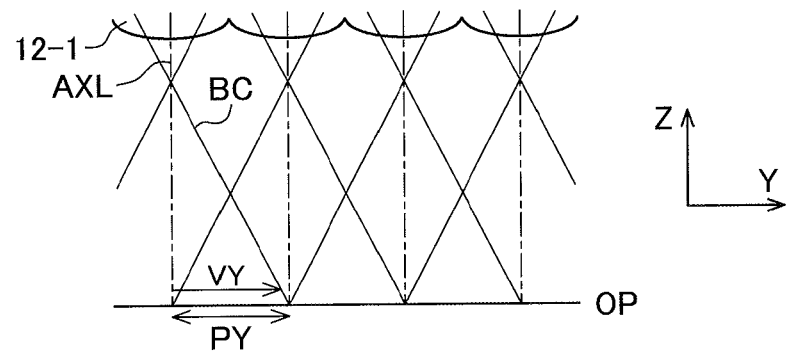

In FIG. 10B, each LED 30 is in the field of view of two first microlenses 12-1. The field of view VY is expressed by the equation (5) below, again using the array pitch PY of the microlenses.

$$VY = PY \quad (5)$$

Since the images formed by the microlenses are slightly distorted, combining the images formed by a large number of microlenses can degrade the image. It was found by experiment that when each LED 30 is in the field of view of four or more microlenses, the image resolution deteriorates significantly due to microlens distortion.

Figure 10C:
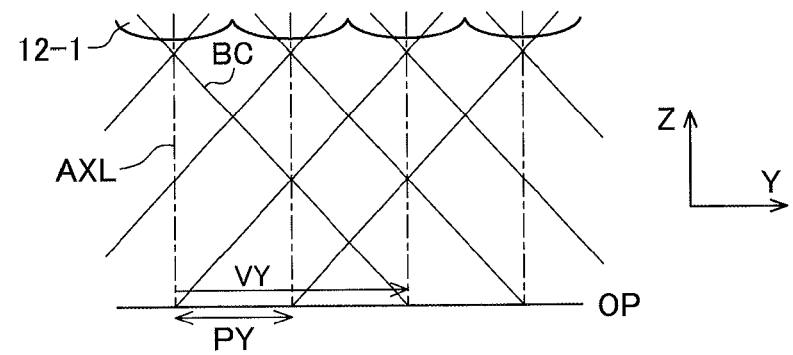

In FIG. 10C, each LED 30 is in the field of view of four first microlenses 12-1. The field of view VY is expressed by equation (6) below, once more using the array pitch PY of the microlenses.

$$VY = 2PY \quad (6)$$

From equations (2), (5), and (6), the condition on the array pitch PY for obtaining a good image is expressed in terms of the meridional focal length FY1, distance LO1, and half-width RAY of the apertures 22 in the Y direction by the following inequality (7).

$$RAY \frac{LO1 - FY1}{2FY1} < PY \leq RAY \frac{LO1 - FY1}{FY1} \quad (7)$$

The operation of the printer 100 will now be briefly recapitulated with reference to FIG. 1. In each of the image forming units 10Y, 10M, 10C, 10K, the surface of the photosensitive drum 41 is charged by the charging roller 42. As the photosensitive drum 41 rotates, its charged surface approaches the LED head 3. The LED head 3 illuminates the charged surface, forming a latent electrostatic image. The developer unit 5 develops the latent electrostatic image, forming a toner image on the surface of the photosensitive drum 41.

A sheet of paper 101 is taken from the paper cassette 60 by the hopping roller 61 and fed toward the transfer belt 81 by transport rollers 62, 63. The transfer belt 81 brings the paper 101 to the image forming units 10Y, 10M, 10C, 10K in that order. In each image forming unit, the rotating photosensitive drum 41 carries the toner image toward the transfer belt 81. The charged transfer roller 80 pulls the toner image from the surface of the photosensitive drum 41 onto the paper 101. From the black image forming unit 10K, the transfer belt 81 carries the paper 101 to the fuser unit 9, which fuses the toner image onto the paper 101 by heat and pressure. To end the operation, the transport rollers 64 and delivery roller 65 deliver the paper 101 onto the stacking tray 7.

The operation of the exposure device or LED head 3 in each image forming unit will be described with reference to FIG. 3. The control unit of the printer 100 outputs control signals to the LED head 3 in accordance with the image data. The driver ICs 31 of the LED head 3 output drive signals to the LEDs 30 in accordance with the control signals from the control unit. The LEDs 30 emit light in amounts determined by the drive signals. The light emitted from the LEDs 30 is transmitted through the lens unit 1 and forms an image on the photosensitive drum 41.

The operation of the lens unit 1 in the sagittal plane will be described with reference to FIG. 7. Sagittal light rays emitted from an LED or more generally emanating from any object 30A in the object plane OP are collimated by the first microlens 12-1, which functions as a collimator lens in the sagittal plane, and propagate in parallel between the first microlens 12-1 and second microlens 12-2. The collimated light rays are focused by the second microlens 12-2 to an inverted image on the image plane IP. For example, the image of an arrow pointing in the +X direction in the object plane OP would be an arrow pointing in the –X direction in the image plane IP. Thus when the lens unit 1 forms an image of an object 30A, it inverts the image in the X direction.

In the specific case in which the first and second microlenses 12-1, 12-2 have the same structure and the object 30A is an LED, the first microlens 12-1 collimates sagittal light rays originating from the LED and the second microlens 12-2 forms a sagittally inverted image 30C of the LED in the image plane.

Sagittal light rays from the object 30A that are not needed for forming the image are blocked by the stop strip 21.

The operation of the lens unit 1 in the meridional plane will be described with reference to FIG. 8. Meridional light rays that are incident on a first microlens 12-1 from an LED or more generally any object 30A in the object plane OP are collected to a point 30B in the intermediate image plane IMP at a distance LI1 from the first microlens 12-1 in the Z direction. The first microlens 12-1 forms a reduced, inverted image of the object 30A at point 30B. From the light rays passing through point 30B, in the image plane IP, the second microlens 12-2 forms an enlarged, inverted image 30C of the image formed at the point 30B. The principal meridional light rays from each point in the object plane OP propagate as parallel telecentric rays between the first microlens 12-1 and the second microlens 12-2.

In the meridional plane, the image 30C is a one-to-one erect image of the object 30A. For example, an image formed from an arrow pointing in the +Y direction in the object plane becomes an arrow pointing in the +Y direction in the image plane. The lens unit 1 thus forms erect images with one-to-one magnification in the Y direction.

In the specific case in which the first and second microlenses 12-1, 12-2 have the same structure and the object 30A is an LED, meridional light rays originating from the LED enter the first microlens 12-1 and are collected at the point 30B located at a distance LS/2 from the first microlens 12-1 in the Z direction. From these rays, the second microlens 12-2 forms a meridionally erect image 30C of the LED in the image plane IP.

In general, the first and second microlenses 12-1, 12-2 are structured in such a manner that the first microlens 12-1 collects meridional light rays from an object 30A in the object plane OP and focuses them to a meridionally inverted image, which the second microlens 12-2 then focuses and re-inverts to form a meridionally erect image on the image plane.

Meridional light rays from the object 30A that not needed for image formation are blocked by the stop strip 21.

Being inverted in the sagittal plane and erect in the meridional plane, the image 30C is a mirror image of the object 30A that appears to have been symmetrically reflected in the meridional plane.

The comparatively short meridional focal lengths and comparatively long sagittal focal lengths of the microlenses enable the first microlenses to collimate incident light sagittally while focusing the light meridionally to an inverted reduced image at the intermediate image plane, and enable the second microlenses to focus the collimated light to a sagittally inverted image while focusing the inverted reduced image to a meridionally erect image.

In an LED printer, it is not possible to obtain correctly formed images of the LEDs on the photosensitive drum from rays that are both sagittally and meridionally collimated, or from rays that are meridionally collimated but are focused to sagittally inverted reduced images. Correctly formed images can be obtained on the photosensitive drum, however, from rays that are sagittally collimated and meridionally focused to inverted reduced images in the intermediate image plane, as in the present embodiment.

Measurement of the focal lengths of the first and second microlenses 12-1, 12-2 of the lens unit 1 will now be described. The focal length of a microlens can be measured by, for example, the nodal slide method, which is used in this description.

Figure 11A:
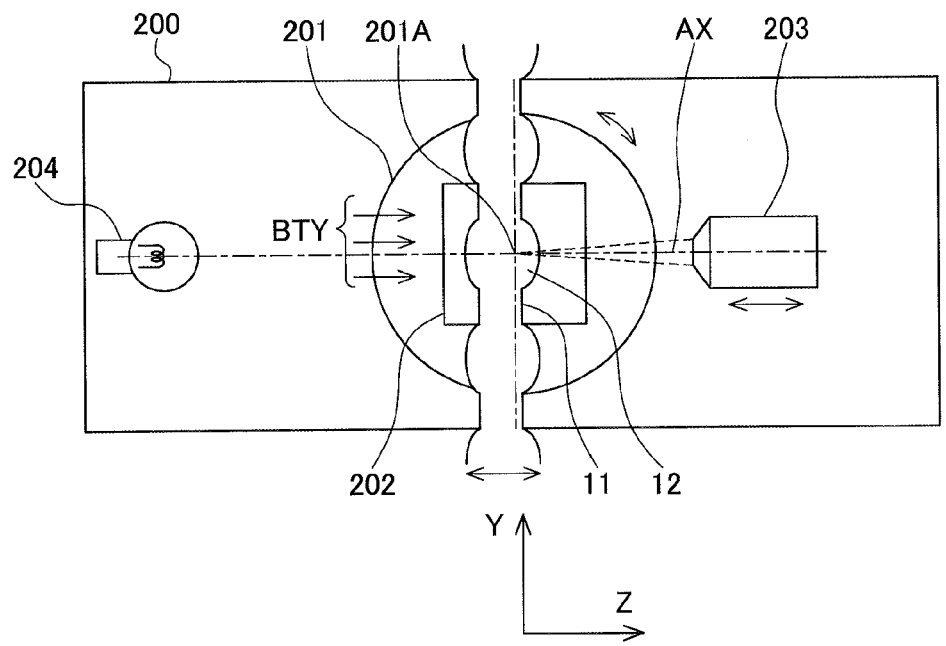
FIG. 11A is a plan view of a system for measurement of focal length.
Figure 11B:
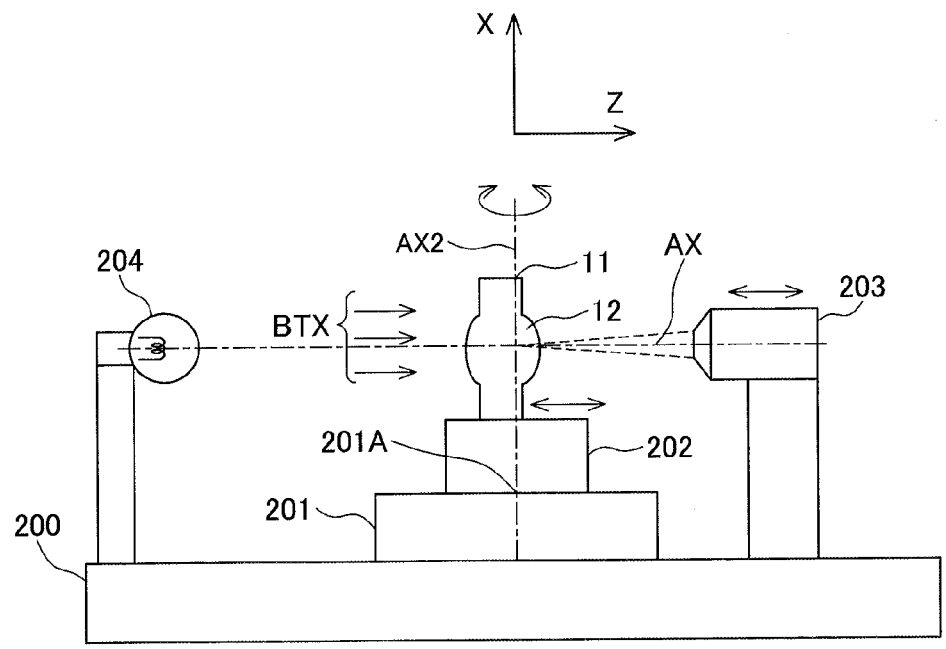
FIG. 11B is a side view of the system in FIG. 11A.

FIG. 11A is a plan view of a focal length measurement system 200 for measurement of focal length using the nodal slide method. FIG. 11B is a side view of the system in FIG. 11A. For brevity, the first microlens 12-1 or second microlens 12-2 being measured will be referred to as the lens 12 under test.

The focal length measurement system 200 includes a turntable 201, a stage 202, a microscope 203, and an illumination device 204. The turntable 201 is rotatable about a rotational axis 201A. The stage 202 is disposed on the turntable 201. The lens 12 under test is secured to the stage 202 in such a manner that the optical axis AX of the lens 12 under test coincides with the optical axis of the microscope 203. The stage 202 and lens 12 under test rotate with the turntable 201. The stage 202 and microscope 203 are movable in a direction parallel to the optical axis AX. The displacement of the microscope 203 is measurable, and is measured with reference to a position in which the object plane of the microscope 203 is positioned at the turntable's rotational axis 201A. The illumination device 204 is operable to emit light rays BTY parallel to the optical axis AX in the meridional plane, or light rays BTX parallel to the optical axis AX in the sagittal plane, and direct these light rays toward the lens 12 under test.

FIG. 11A illustrates measurement of the meridional focal length FY. The microscope 203 is moved away from the lens 12 under test to a position that minimizes the size of the image formed by the lens 12 under test from the parallel light rays BTY emitted by the illumination device 204. The stage 202 and microscope 203 are then moved to respective positions such that a slight rotation of the turntable 201 does not affect the point of convergence of the parallel light rays BTY, i.e., the position of the image is not affected, and the displacement ZY1 of the microscope 203 at that position is measured. The measured displacement is the distance from the rotational axis 201A to the object plane of the microscope 203, in the state in which the rotational axis 201A lies in the meridional principal plane of the lens 12 under test. This displacement ZY1 represents the meridional focal length FY of the lens 12 under test.

Next, with the stage 202 secured in that position, the microscope 203 is moved toward the lens 12 under test until the object plane of the microscope 203 is at the apex of the surface of the lens 12 under test, and the displacement ZY2 of the microscope 203 is measured. This displacement ZY2 represents the distance from the rotational axis 201A to the object plane of the microscope 203, and the distance from meridional principal plane to the apex of the surface of the lens 12 under test. By measuring the distance LO from the apex of the surface of the lens 12 under test to the object plane by a different method (not illustrated), the distance SO from the object plane to the meridional principal plane of the lens 12 under test can be obtained as follows:

$$SO = ZY2 + LO$$

FIG. 11B illustrates the measurement of the sagittal focal length FX. The microscope 203 is moved away from the lens 12 under test to a position that minimizes the size of the image formed by the lens 12 under test from the parallel light rays BTX emitted by the illumination device 204. The stage 202 and microscope 203 are then moved to respective positions such that a small rotation of the turntable 201 does not affect the point of convergence of the parallel light rays BTX, i.e., the position of the image is not affected, and the displacement ZX1 is measured. The measured displacement is the distance from the rotational axis 201A to the object plane of the microscope 203, in the state in which the rotational axis 201A lies in the sagittal principal plane of the lens 12 under test. This displacement ZX1 represents the sagittal focal length FX of the lens 12 under test.

Next, with the stage 202 secured in that position, the microscope 203 is moved toward the lens 12 under test until the object plane of the microscope 203 is at the apex of the surface of the lens 12 under test, and the displacement ZX2 of the microscope 203 is measured. This displacement ZX2 represents the distance from the rotational axis 201A to the object plane of the microscope 203, and the distance from sagittal principal plane to the apex of the surface of the lens 12 under test. By measuring the distance LO from the apex of the surface of the lens 12 under test to the object plane by a different method (not illustrated), the distance SO from the object plane to the sagittal principal plane of the lens 12 under test can be obtained as follows:

$$SO = ZX2 + LO$$

The above embodiment has the following effects.

Since the lens unit in this embodiment has a linear array of first lenses (microlenses) with mutually parallel optical axes and an array of second lenses (microlenses) with the same optical axes as the first lenses, and since the first and second lenses are configured in such a manner that the first lenses collimate sagittal rays of light originating from the object plane and the second lenses form an image in the image plane from the collimated sagittal rays, for reasons described below, the lens unit has high optical efficiency: it can collect many rays from a light source in the object plane and can form a bright image even if the light source emits a reduced amount of light.

In the conventional structure in which light rays from an object converge to points between the first and second lenses in both the meridional and sagittal planes, and the second lenses form images from the light rays diverging from these points, the radius of curvature of the surfaces of the first lenses facing toward the object plane and the radius of curvature of the surfaces of the second lenses facing toward the image plane are comparatively small. If the lens dimension (width or radius) in the sagittal direction is increased to accept more light, the lens thickness increases. The increased lens thickness increases the amount of optical crosstalk between adjacent lenses in the array, lowering the image contrast.

In this embodiment, in which the first lens collimates sagittal light rays originating from the object plane and the second lens forms an image from the collimated light rays, the surface of the first lens facing toward the object plane and the surface of the second lens facing toward the image plane have a relatively large sagittal radius of curvature. Therefore, an increase in the lens dimensions in the X direction entails only a minor increase in lens thickness, with little or no increase in optical crosstalk. The lenses can accordingly be enlarged to accept more light with little or no reduction in image contrast, which enables a lens unit with high optical efficiency to be provided.

For example, if the half width RLX (e.g., 1.5 mm) of the first and second microlenses 12-1, 12-2 in the X direction is three times the half width RLY (e.g., 0.5 mm) in the Y direction, the amount of light transmitted by the microlenses is much greater than when both half widths RLX and RLY are the same (e.g., 0.5 mm).

Furthermore, since the light rays emitted from the first lens are collimated in the sagittal plane, aberration is reduced, reducing distortion or blurring of the image.

The first and second microlenses 12-1, 12-2 may have spherical surfaces, anamorphic aspheric surfaces, parabolic surfaces, elliptical surfaces, hyperbolic surfaces, conical surfaces, or various other surface configurations.

The first and second lens strips 11-1, 11-2 may be molded in a metal or plastic mold. Alternatively, they may be formed by a milling process.

The first and second lens strips 11-1, 11-2 may be made from a resin material as described above, or from various other materials such as, for example, glass.

The first and second lens strips 11-1, 11-2 may include one or more lenses in addition to the first and second microlenses 12-1, 12-2.

The stop strip 21 may be formed of injection molded polycarbonate as described above, or may be formed by cutting or etching a metal material.

The stop strip 21 may include one or more apertures in addition to the apertures 22 corresponding to the first and second microlenses 12-1, 12-2, or may have fewer apertures than the number of pairs of the first and second microlenses 12-1, 12-2.

The light emitting elements described as LEDs above may be either conventional LEDs or organic light emitting diodes (OLEDs, also referred to as electroluminescence (EL) elements). Alternatively, non-LED elements such as laser elements may be used.

The terms 'orthogonal,' 'parallel,' and 'the same' are not used in the strict sense herein; they should be interpreted to include 'substantially orthogonal,' 'substantially parallel,' and 'substantially the same'.

The optical axes of the first microlenses 12-1 in the first lens strip 11-1 may be substantially parallel to each other. The angle between any two of the optical axes may be 2 degrees or less.

The first direction or Y direction may be substantially orthogonal to the optical axes, and may form an angle of 85 to 95 degrees with each of the optical axes.

The second plane or meridional plane may substantially include the optical axes. The first plane or sagittal plane also may substantially include the optical axes.

Second Embodiment

The lens unit in the second embodiment differs from the lens unit 1 in the first embodiment in the shape of the microlenses.

Figure 12:
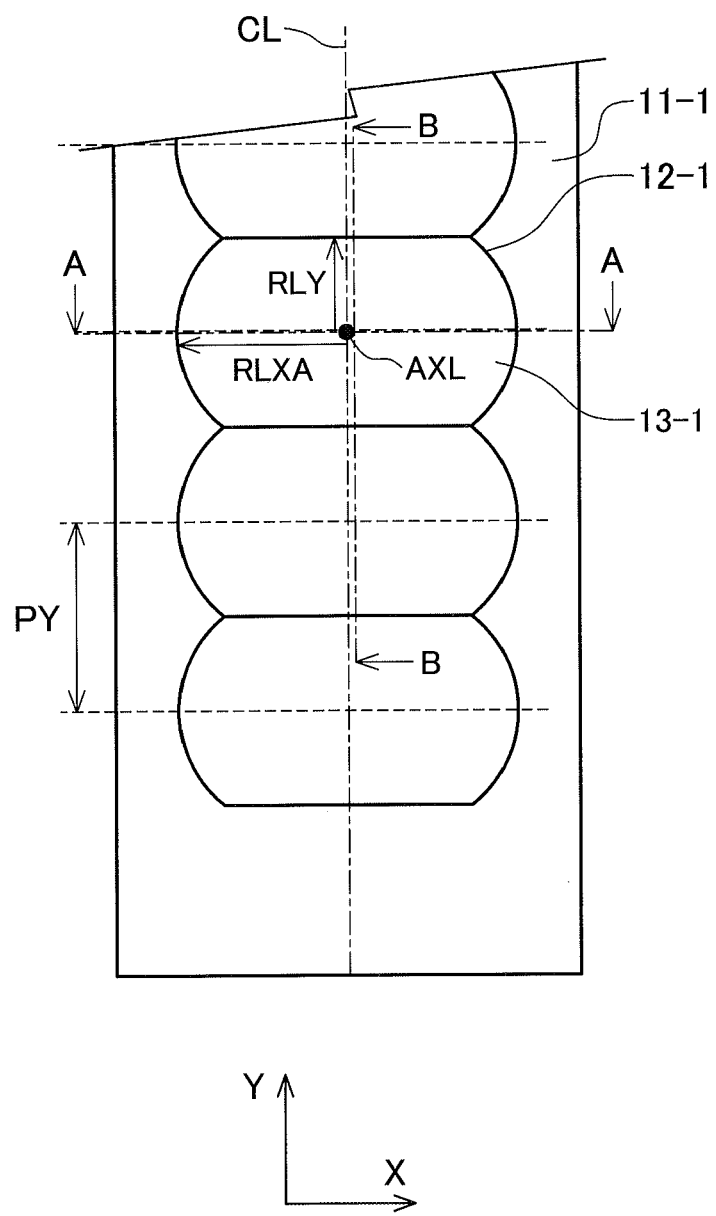
FIG. 12 is a plan view of the first lens array in a second embodiment.
Figure 13:
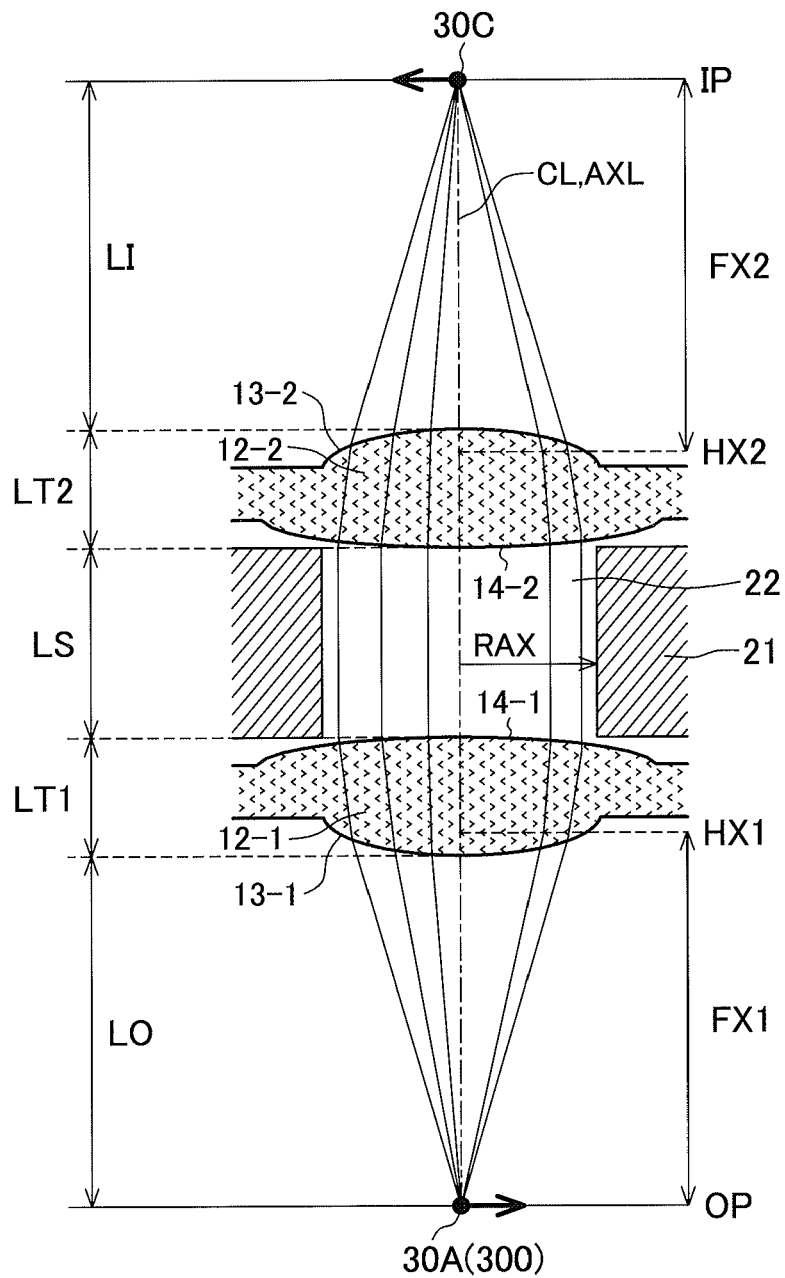
FIGS. 13 and 14 are sectional views of the lens unit in the second embodiment in the sagittal plane.
Figure 14:
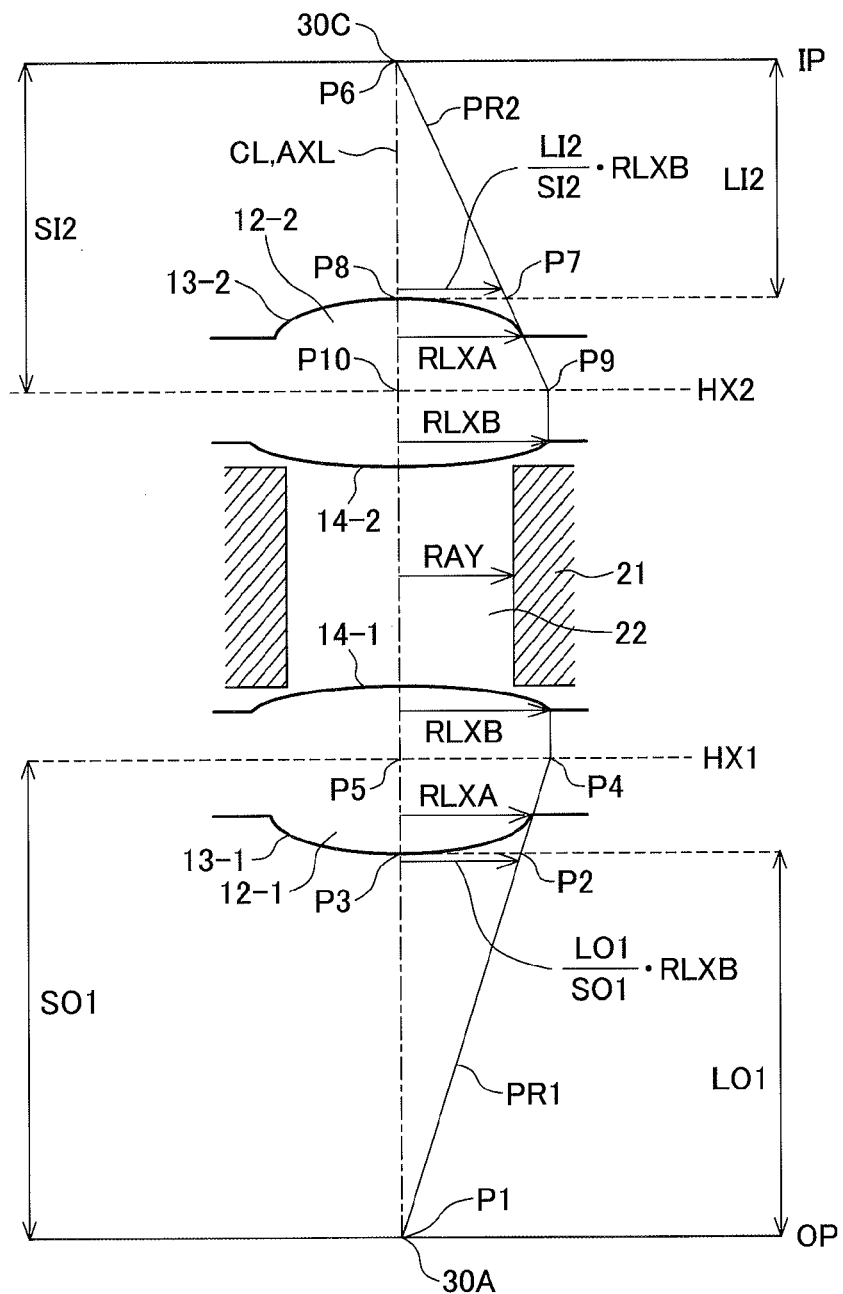
Figure 15:
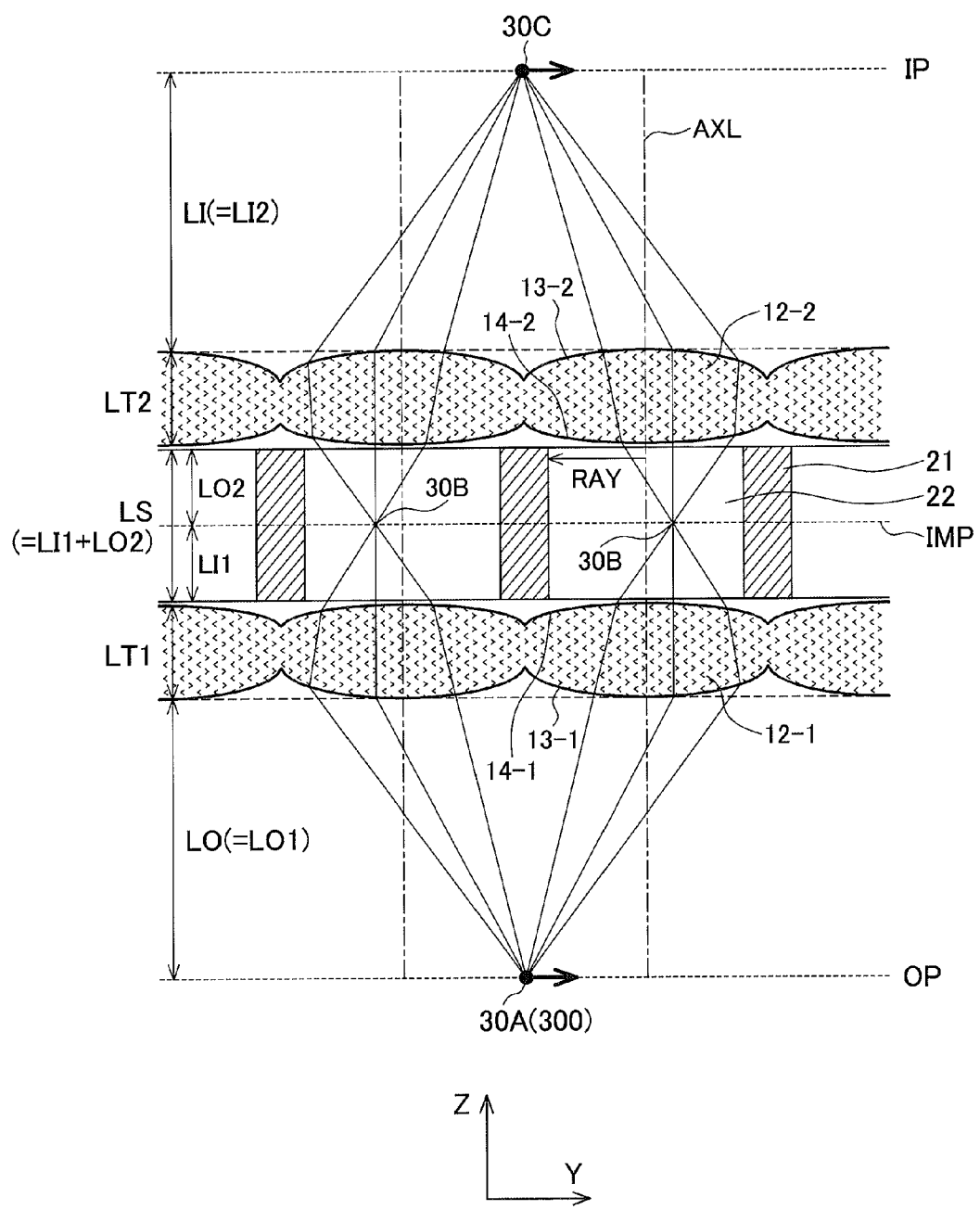
FIG. 15 is a sectional view of the lens unit in the second embodiment in the meridional plane.

FIG. 12 is a plan view showing the structure of the first lens strip 11-1. FIGS. 13 and 14 are sectional views of the lens unit in the sagittal plane at line A-A in FIG. 12. FIG. 15 is a sectional view of the lens unit in the meridional plane at line B-B in FIG. 12. FIGS. 13, 14, and 15 also indicate the object plane OP and image plane IP.

As FIGS. 12 to 15 show, each first microlens 12-1 has an outer surface 13-1 facing toward the object plane and an inner surface 14-1 facing toward the image plane, and each second microlens 12-2 has an inner surface 14-2 facing toward the object plane and an outer surface 13-2 facing toward the image plane.

The shape of the outer surface 13-1 of a first microlens 12-1 in the XY plane is a circle of radius RLXA truncated by two parallel lines at distances RLY (<RLXA) from the center of the circle. The outer surface 13-1 is RLXA×2 wide in the X direction and RLY×2 long in the Y direction, making the width in the X direction greater than the length in the Y direction.

The shape of the inner surface 14-1 in the XY plane is a circle of radius RLXB truncated by two parallel lines at distances RLY (<RLXB) from the center of the circle. The inner surface 14-1 is RLXB×2 wide in the X direction and RLY×2 long in the Y direction, making the width in the X direction greater than the length in the Y direction.

In the drawings, the outer surface 13-2 of a second microlens 12-2 has the same shape as the outer surface 13-1 of a first microlens 12-1, and the inner surface 14-2 of a second microlens 12-2 has the same shape as the inner surface 14-1 of a first microlens 12-1, but outer surface 13-1 and outer surface 13-2 may have different shapes, and inner surface 14-1 and inner surface 14-2 may have different shapes.

As shown in FIGS. 13 and 14, when widths are measured in the X direction in the sagittal plane, the outer surfaces 13-1, 13-2 of the first and second microlenses 12-1, 12-2 are narrower than the inner surfaces 14-1, 14-2. The radii RLXA of the outer surfaces 13-1, 13-2 are accordingly smaller than the radii RLXB of the inner surfaces 14-1, 14-2.

In FIG. 14, HX1 represents the sagittal principal plane of hypothetical parallel rays incident on the inner surface 14-1 of a first microlens 12-1, propagating in the sagittal plane toward the object plane OP. Among such rays, PR1 represents a peripheral ray that is incident on the inner surface 14-1 at its outermost edge. P1 represents the position where peripheral ray PR1 meets the optical axis AXL, which is also the position of an object 30A in the object plane OP. P3 represents the apex of the outer surface 13-1. P2 represents the position where a plane tangent to the outer surface 13-1 at the apex P3 meets peripheral ray PR1. P4 represents the position where peripheral ray PR1 meets the sagittal principal plane HX1. P5 represents the position where the optical axis AXL meets the sagittal principal plane HX1.

Triangle P1P2P3 is similar to triangle P1P4P5. If SO1 is the distance from the object 30A to the sagittal principal plane HX1 and LO1 is the distance from the object 30A to the outer surface 13-1, the length of line P2P3 is given by the following expression (8).

$$\frac{LO1}{SO1} RLXB \quad (8)$$

If peripheral ray PR1 passes through the outer surface 13-1 at its outermost edge, the half-width RLXA of the outer surface 13-1 in the X direction in the sagittal plane satisfies the following inequality (9).

$$\frac{LO1}{SO1} RLXB < RLXA < RLXB \quad (9)$$

In one aspect of the second embodiment, the half-width or radius RLXA of the outer surface 13-1 of the first microlens 12-1 satisfies the condition given by the above inequality (9).

In another aspect of the second embodiment, when parallel rays propagating in the sagittal plane toward the object plane are incident on the inner surface 14-1 of the first microlens 12-1, a ray incident at the edge of the inner surface 14-1 passes through the edge of the outer surface 13-1.

In FIG. 14, HX2 represents the sagittal principal plane of parallel rays incident on the inner surface 14-2 of a second microlens 12-2, propagating in the sagittal plane toward the image plane IP. Among such rays, PR2 represents a hypothetical peripheral ray incident on the inner surface 14-2 at its outermost edge. P6 represents the position where peripheral ray PR2 meets the optical axis AXL; this is also the position of the image 30C in the image plane IP. P8 represents the apex of the outer surface 13-2. P7 represents the position where peripheral ray PR2 meets a plane tangent to the outer surface 13-2 at the apex P8. P9 represents the position where peripheral ray PR2 meets the sagittal principal plane HX2. P10 represents the position where the optical axis AXL meets the sagittal principal plane HX2.

Triangle P6P7P8 is similar to triangle P6P9P10. If SI2 is the distance from the sagittal principal plane HX2 to the image 30C and LI2 is the distance from the outer surface 13-2 to the image 30C, the length of line P7P8 is given by the following expression (10).

$$\frac{LI2}{SI2} RLXB \quad (10)$$

If peripheral ray PR2 passes through the outer surface 13-2 at its outermost edge, the half-width or radius RLXA of the outer surface 13-2 in the sagittal plane satisfies the condition given by the following inequality (11).

$$\frac{LI2}{SI2} RLXB < RLXA < RLXB \quad (11)$$

In one aspect of the second embodiment, the sagittal half-width or radius RLXA of the outer surface 13-2 of the second microlens 12-2 satisfies the condition given by the above inequality (11).

In another aspect of the second embodiment, when parallel rays propagating in the sagittal plane toward the image 30C are incident on the inner surface 14-2 of the second microlens 12-2, the ray incident at the edge of the inner surface 14-2 passes through the edge of the outer surface 13-2.

In the sagittal plane, the inner surfaces 14-1, 14-2 of the first and second microlenses 12-1, 12-2 are wider than the aperture 22 between them. More specifically, the radius RLXB of the inner surfaces 14-1, 14-2 is greater than the radius RAX of the aperture 22.

In the meridional plane, the lens unit in the second embodiment has the same structure as the lens unit 1 in the first embodiment.

Besides the effects of the first embodiment, the second embodiment has the following effects.

In the second embodiment, the outer curved surfaces of the microlenses are narrower than the inner curved surfaces in the X direction. Making one surface of the lens smaller than the other surface reduces the lens area that requires processing, consequently reducing the processing time and improving the processing accuracy. In particular, by limiting the width of the outer curved surfaces of the microlenses to the range of effective incident rays, the need for processing of lens areas on which effective rays are not incident can be eliminated, and the processing range can be minimized.

In general, when a lens is enlarged in radius or any other dimension in order to improve its optical efficiency by increasing the amount of transmitted light, the lens area requiring processing increases, increasing the processing time and lowering the processing accuracy. In addition, the lens becomes thinner at its periphery, reducing the strength of the lens and making it more subject to distortion.

In the second embodiment, the lens dimensions can be enlarged with less increase in lens area that requires processing, and less decrease in the peripheral thickness of the lenses. If the width of the outer surfaces of the microlenses is limited to the range of effective incident rays, the lens area that requires processing can be minimized, and the microlenses can be enlarged with minimal reduction in their peripheral thickness. Consequently the strength of the lens array can be maintained even if the lens size is increased. More precisely, although convex lenses with the same radius of curvature become thinner at the edge as the lens diameter increases, in the second embodiment the dimensions of the outer lens surface can remain small enough that the lens retains adequate thickness at its edges.

In this embodiment, in the sagittal direction or X direction, the curved inner surfaces of the microlenses are wider than the apertures. This relationship simplifies the mating of the first lens array with the stop member, making it easier to assemble the lens unit, because even if a small unintended sagittal offset arises between the first or second lens array and the stop member when the lens unit is assembled, all rays that pass through the apertures are still properly refracted by the curved inner surfaces of the microlenses. If the microlenses are designed so that rays passing through the outer edges of the inner curved surfaces also pass through the outer edges of the outer curved surfaces, then all rays passing through the apertures also pass through the outer curved surfaces of the microlenses, and no loss of resolution or other image degradation occurs due to the transmission of rays that miss the inner or outer curved surfaces of the microlenses.

Third Embodiment

The lens unit in the third embodiment differs from the lens unit 1 in the first embodiment in the arrangement of the microlenses.

Figure 16:
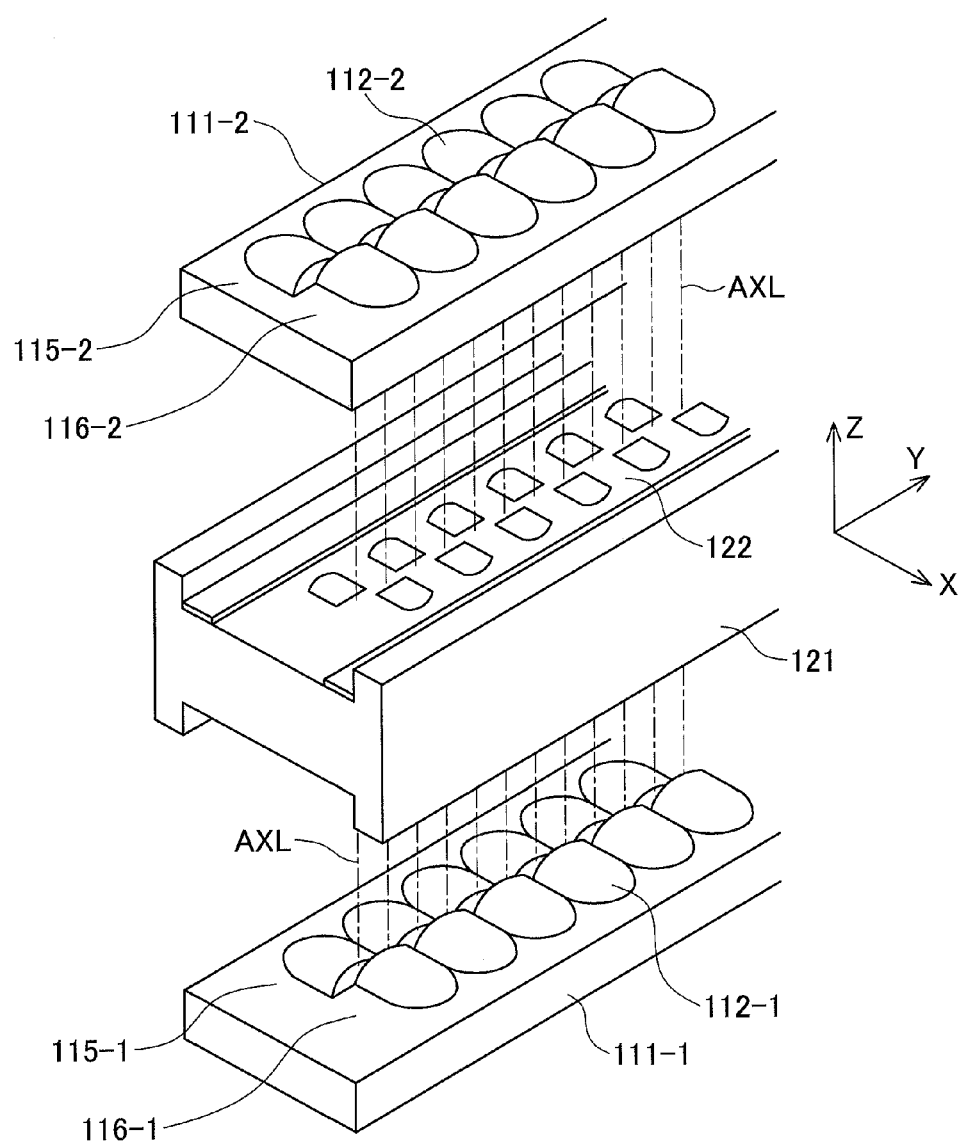
FIG. 16 is an exploded perspective view of the lens unit in a third embodiment.

Referring to FIG. 16, the lens unit includes a first lens strip 111-1 facing toward the object plane and a second lens strip 111-2 facing toward the image plane. The first lens strip 111-1 has two rows of first microlenses 112-1; the second lens strip 111-2 has two rows of second microlenses 112-2.

More specifically, the first lens strip 111-1 includes a first row of lenses 115-1 and a second row of lenses 116-1, both rows including a plurality of first microlenses 112-1 with mutually parallel optical axes extending in the Z direction. Each row is substantially straight and extends in the Y direction, orthogonal to the optical axes of the first microlenses 112-1.

The second lens strip 111-2 likewise includes a first row of lenses 115-2 and a second row of lenses 116-2, both rows including a plurality of second microlenses 112-2, which correspond pairwise (one-to-one) to the first microlenses 112-1. Each paired first microlens 112-1 and second microlens 112-2 have mutually coincident optical axes AXL. The second microlenses 112-2 are thus arranged in substantially straight rows extending in the Y direction, orthogonal to their optical axes. The first microlenses 112-1 and the second microlenses 112-2 have the same array spacing.

The lens unit also includes a stop strip 121 interposed between the first lens strip 111-1 and second lens strip 111-2 to limit light incident on the second lens strip 111-2 from the direction of the first lens strip 111-1. The stop strip 121 has a plurality of apertures 122 that allow light rays to pass through from the first microlenses 112-1 to the corresponding second microlenses 112-2.

The structure of the first lens strip 111-1 will now be further described with reference to FIG. 17. The first row of lenses 115-1 and second row of lenses 116-1 both extend parallel to the longitudinal direction of the first lens strip 111-1. With respect to this direction, first microlenses 112-1 in the first row of lenses 115-1 alternate with first microlenses 112-1 in the second row of lenses 116-1. The array spacing of the first microlenses 112-1 is PY×2 in the first row of lenses 115-1 and PY×2 in the second row of lenses 116-1. In the longitudinal direction of the first lens strip 111-1 taken as a whole, the spacing of the alternating first microlenses 112-1 is PY.

In the XY plane, the shape of each first microlens 112-1 in the first row of lenses 115-1 is a circle of radius RLX truncated in the Y direction by two parallel lines extending in the X direction, at distances RLY (<RLX) from the center of the circle, and truncated in the X direction by a line passing through the center of the circle in the Y direction, parallel to the row of microlenses. Each first microlens 112-1 may have, for example, the shape of one half of a first microlens 12-1 in the first embodiment, this shape being obtained through bisection of the first microlens 12-1 by the YZ plane. Each first microlens 112-1 is RLX wide in the X direction in the sagittal plane and RLY×2 long in the Y direction in the meridional plane. As a specific example, RLX may be 1.5 mm and RLY may be 0.5 mm.

The shapes of the first microlenses 112-1 in the first row of lenses 115-1 and those in the second row of lenses 116-1 are symmetrical or substantially symmetrical to each other by rotation through 180 degrees in a third plane orthogonal to the second direction or Z direction. That is, the shapes of the first microlenses 112-1 in the second row of lenses 116-1 are obtained by rotating the first microlenses 112-1 in the first row of lenses 115-1 by 180 degrees around an axis of rotation extending in the Z direction.

The optical axes AXL of the first microlenses 112-1 in both rows of lenses 115-1, 116-1 in the first lens strip 111-1 are located on the inner truncated edges of the first microlenses 112-1, and are substantially centered in the width direction or X direction of the lens unit. The optical axes of the first microlenses 112-1 thus intersect or substantially intersect a line CL passing through the center of the lens unit in the X direction. The first microlenses 112-1 in the first row of lenses 115-1 and the first microlenses 112-1 in the second row of lenses 116-1 are in mutual contact on line CL.

Each pair of first microlenses 112-1 that are adjacent in the Y direction in the first row of lenses 115-1 or second row of lenses 116-1 are in mutual contact with no intervening gap. Therefore, the half length RLY of the first microlens 112-1 equals the array spacing PY.

The second lens strip 111-2 has the same structure as the first lens strip 111-1 with the first microlenses 112-1 replaced by second microlenses 112-2.

Figure 18:
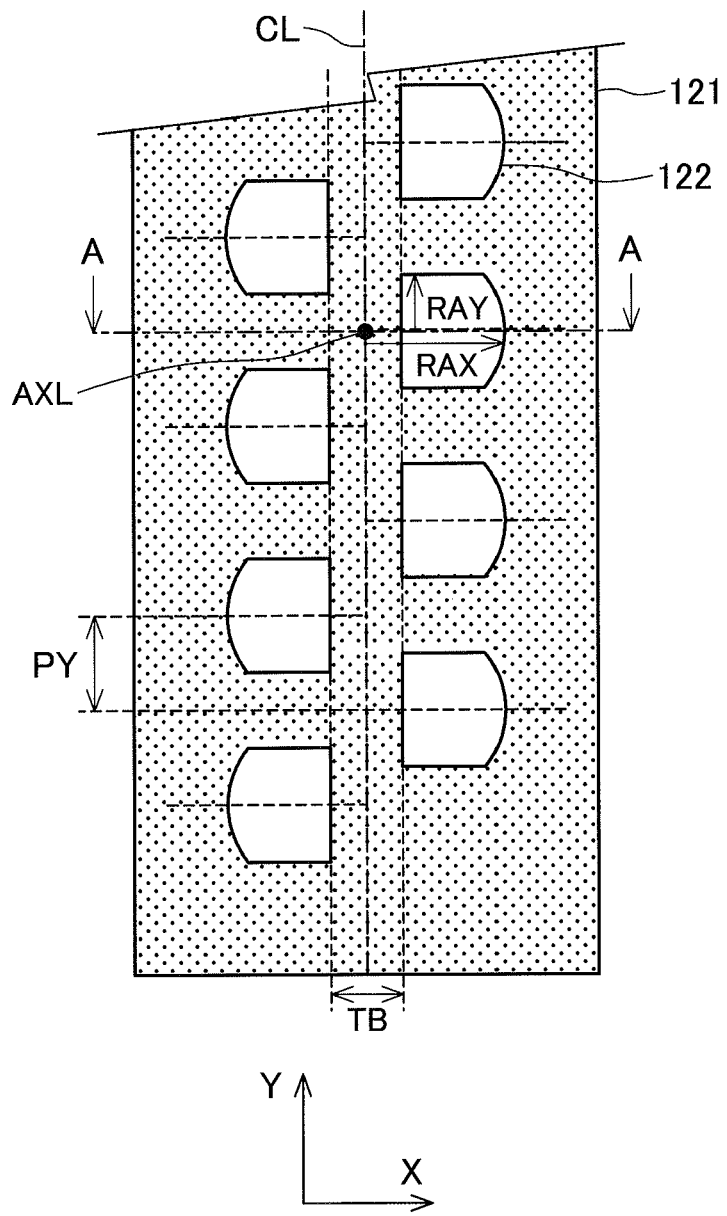
FIG. 18 is a plan view of the stop member in the third embodiment.

FIG. 18 shows a plan view of the apertures 122 in the stop strip 121. The apertures 122 are arranged to face the first microlenses 112-1 with the same array pitch PY as the first microlenses 112-1. The shape of each aperture 122 is a circle of radius RAX centered at the optical axis AXL of the corresponding first microlens 112-1, truncated in the Y direction by two parallel lines at distances RAY (<RAX) from the center AXL, and in the X direction by a line at a distance TB/2 from the center AXL, this line extending in the Y direction, parallel to the row of the microlenses. The optical axis AXL of each first microlens 112-1, which is positioned on the center line CL of the lens unit, is thus exterior to the corresponding aperture 122. Light rays originating from the object plane and propagating on the optical axes AXL of the first microlenses 112-1 are blocked by the stop strip 121.

Figure 17:
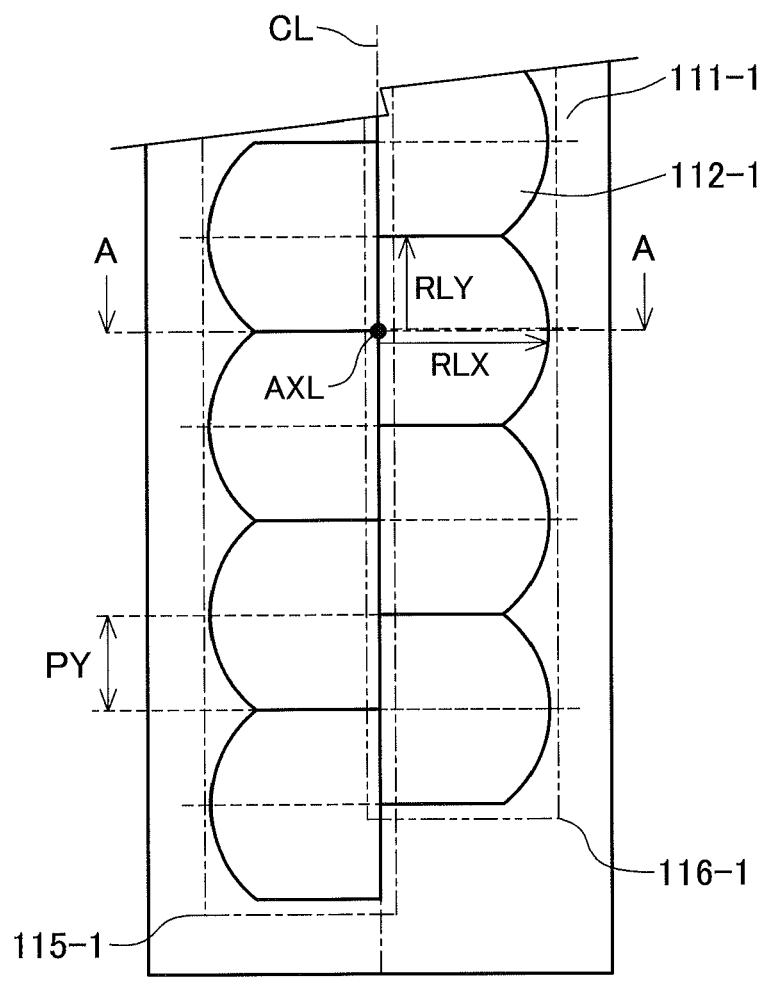
FIG. 17 is a plan view of the first lens array in the third embodiment.
Figure 19:
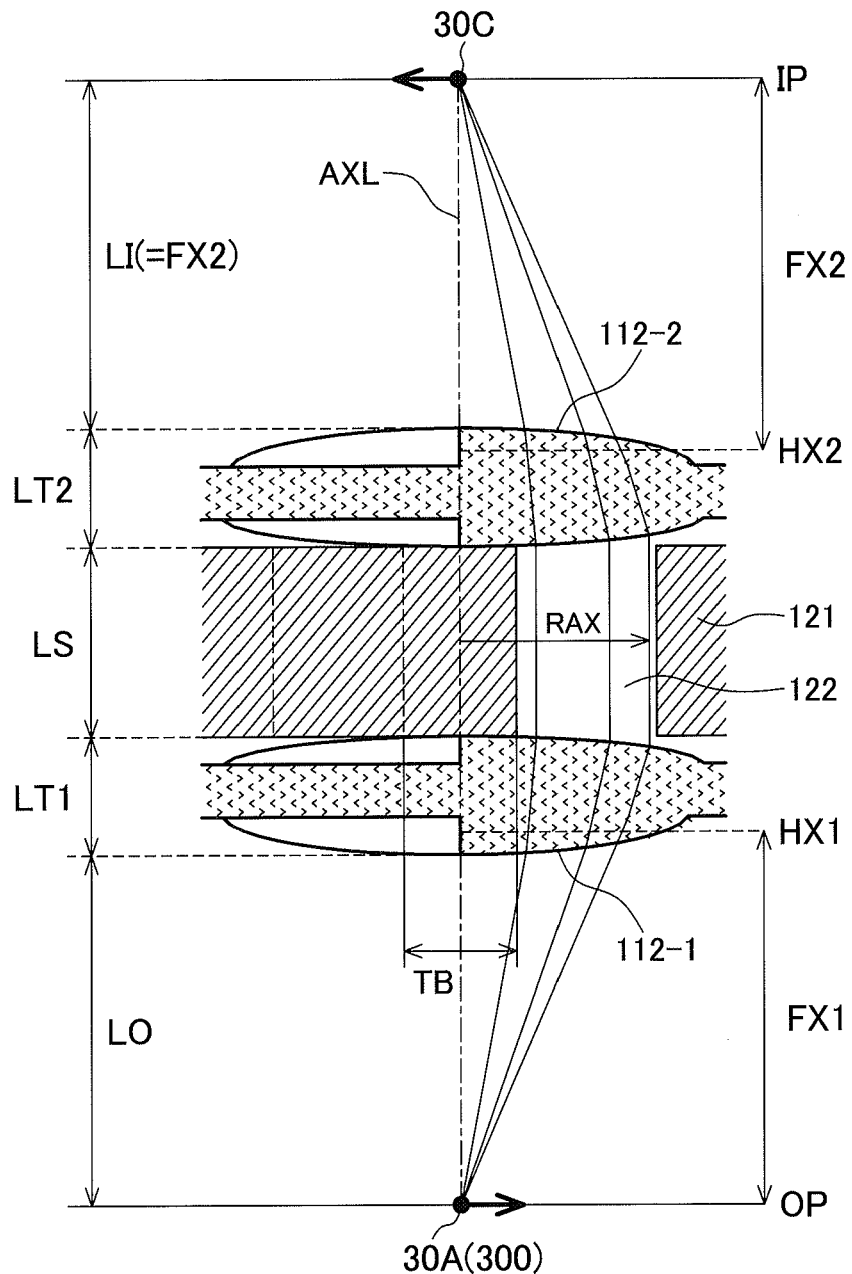
FIG. 19 is a sectional view of the lens unit in the third embodiment in the sagittal plane.

FIG. 19 shows a sectional view of the lens unit in the sagittal plane along line A-A in FIGS. 17 and 18, and indicates the object plane OP and image plane IP.

An object 30A such as an LED 30 in the LED array 300 is disposed in the object plane OP, aligned with the center line CL (FIG. 17) of the lens unit. The first microlens 112-1 is disposed at a distance LO, measured on the optical axis AXL, from the object plane OP. The second microlens 112-2 faces the first microlens 112-1 with the same optical axis AXL and is separated from the first microlens 112-1 by a distance LS measured on the optical axis AXL. The image plane IP of the lens unit is at a distance LI from the second microlens 112-2 measured on the optical axis AXL. The first microlens 112-1 has a thickness LT1; the second microlens 112-2 has a thickness LT2.

The first microlens 112-1 is disposed in a position such that for hypothetical light rays propagating toward the object plane OP, the sagittal focal point coincides with the object 30A in FIG. 19, and the distance from the sagittal principal plane HX1 to the object plane OP equals the sagittal focal length FX1. The second microlens 112-2 is disposed in a position such that for rays propagating away from the object plane OP, the sagittal focal point coincides with the image 30C formed in the image plane IP and the distance from the sagittal principal plane HX2 to the image plane IP equals the sagittal focal length FX2.

In this embodiment, the surface of the first microlens 112-1 facing toward the object plane and the surface of the second microlens 112-2 facing toward the image plane have radii of curvature large enough that the FX1-LO difference and FX2-LI difference can be ignored. Therefore, the sagittal focal length FX1 of the first microlens 112-1 is substantially equal to the distance LO from the lens to the object plane, and the sagittal focal length FX2 of the second microlens 112-2 is substantially equal to the distance LI from the lens to the image plane.

The operation of the lens unit in the sagittal plane will be described with reference to FIG. 19. Sagittal light rays emitted from the LED 30 or object 30A in the object plane OP are collimated by the first microlens 112-1 and propagate in parallel between the first microlens 112-1 and second microlens 112-2. The collimated light rays are focused by the second microlens 112-2 to an image 30C on the image plane IP. For example, the image of an arrow pointing in the +X direction in the object plane OP would be an arrow pointing in the −X direction in the image plane IP. Sagittal light rays from the object 30A that are not needed for image formation are blocked by the stop strip 121.

In the meridional plane, the image 30C is a one-to-one erect image of the object 30A. For example, the image of an arrow pointing in the +Y direction in the object plane is an arrow pointing in the +Y direction in the image plane.

Since the image 30C is inverted in the sagittal plane and erect in the meridional plane, the image 30C is a mirror image of the object 30A that appears to have been symmetrically reflected in the meridional plane.

Besides the effects of the first embodiment, the third embodiment has the following effect.

Since the first and second lens arrays have two rows of microlenses arranged in the Y direction, the spacing of the microlenses in the Y direction can be reduced, and more uniform optical characteristics can be obtained, in comparison with lens arrays having a single row of lenses. More specifically, the periodic decrease in image brightness or resolution due to the lens arrangement can be reduced and more uniform optical characteristics can be obtained over the lens unit as a whole, consequently over the exposure device as a whole.

Since the microlenses in the lens unit in the third embodiment shown in FIG. 16 are formed alternately on the +X side and −X side of the optical axis AXL, each microlens is confined to the half-plane on just one side of its optical axis, and the amount of light available for image formation is less per microlens than in the first embodiment, but the lens unit in FIG. 16 has substantially twice as many microlenses as the lens unit shown in FIG. 4. Both lens units transmit substantially the same total amount of light.

Fourth Embodiment

The lens unit in the fourth embodiment differs from the lens unit in the third embodiment in the shape of the microlenses.

Figure 20:
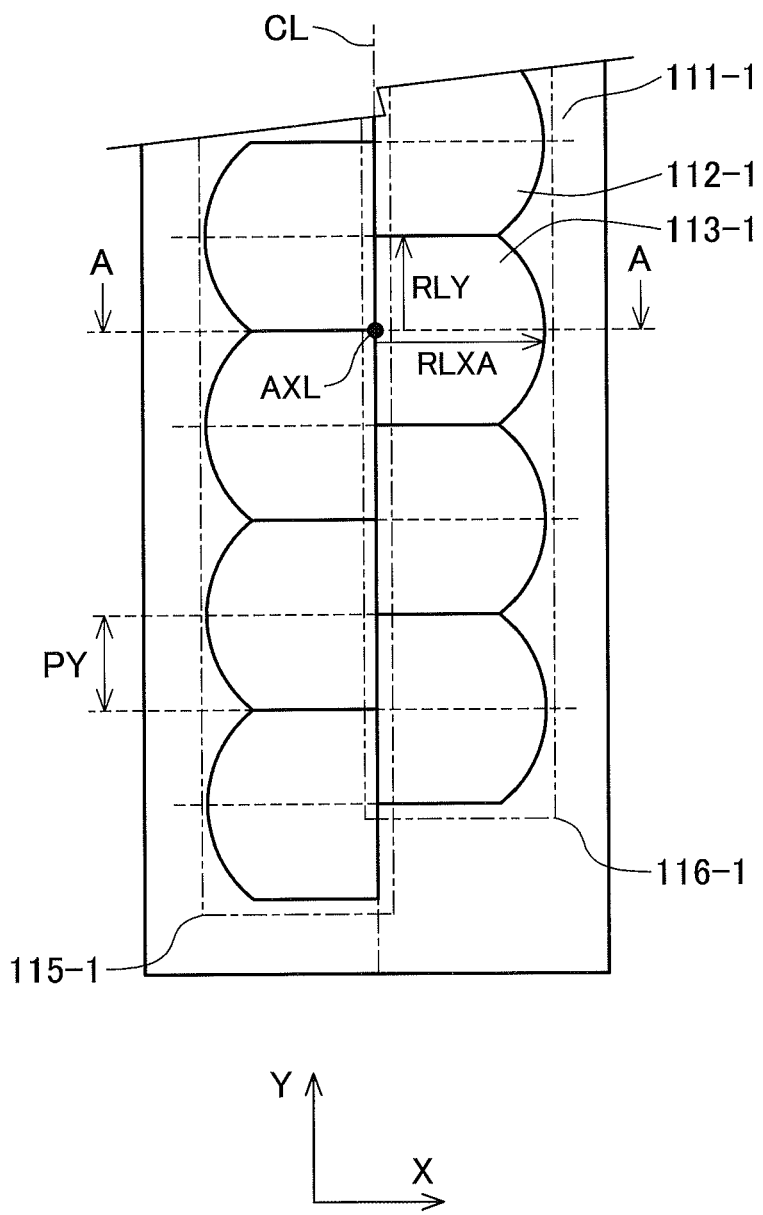
FIG. 20 is a plan view of the first lens array in a fourth embodiment.
Figure 21:
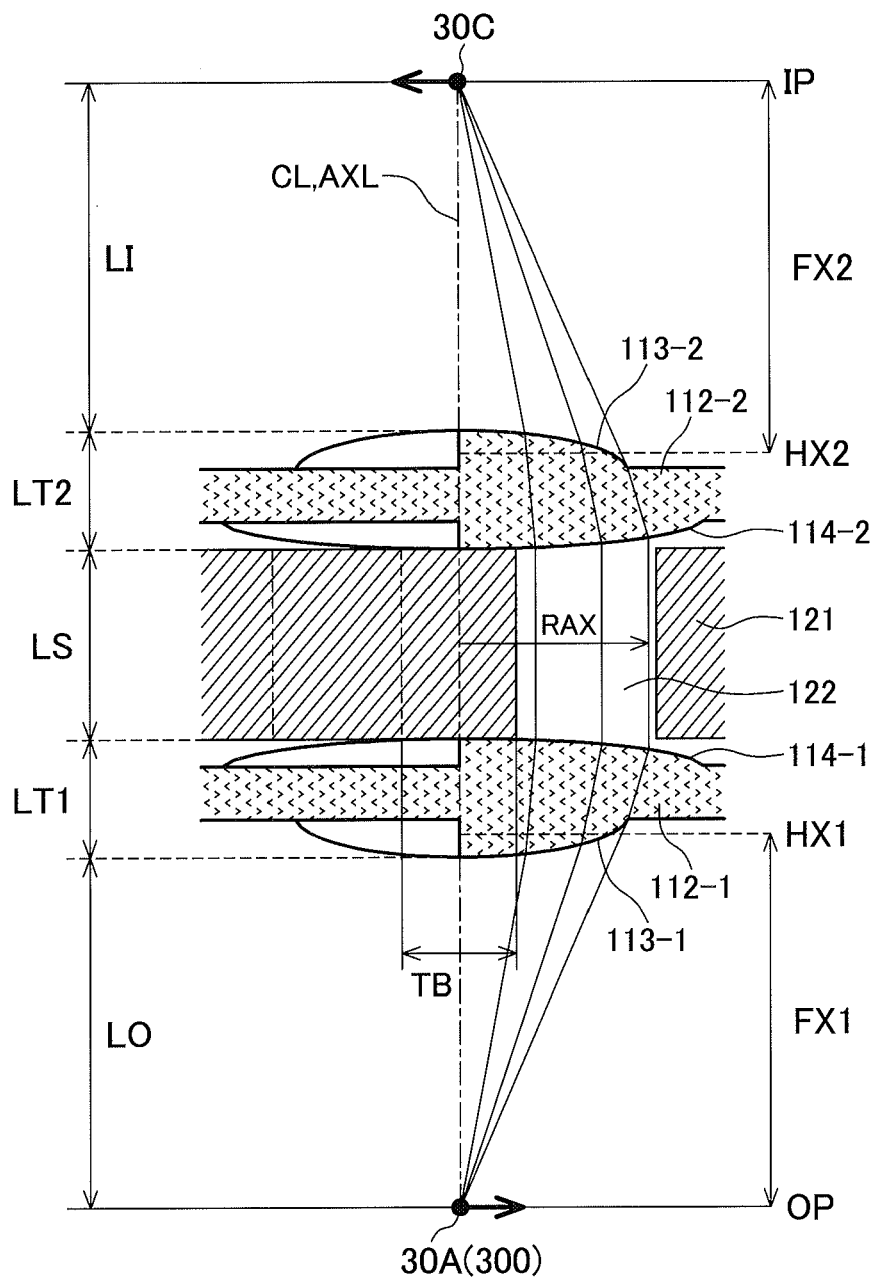
FIGS. 21 and 22 are sectional views of the lens unit in the fourth embodiment in the sagittal plane.
Figure 22:
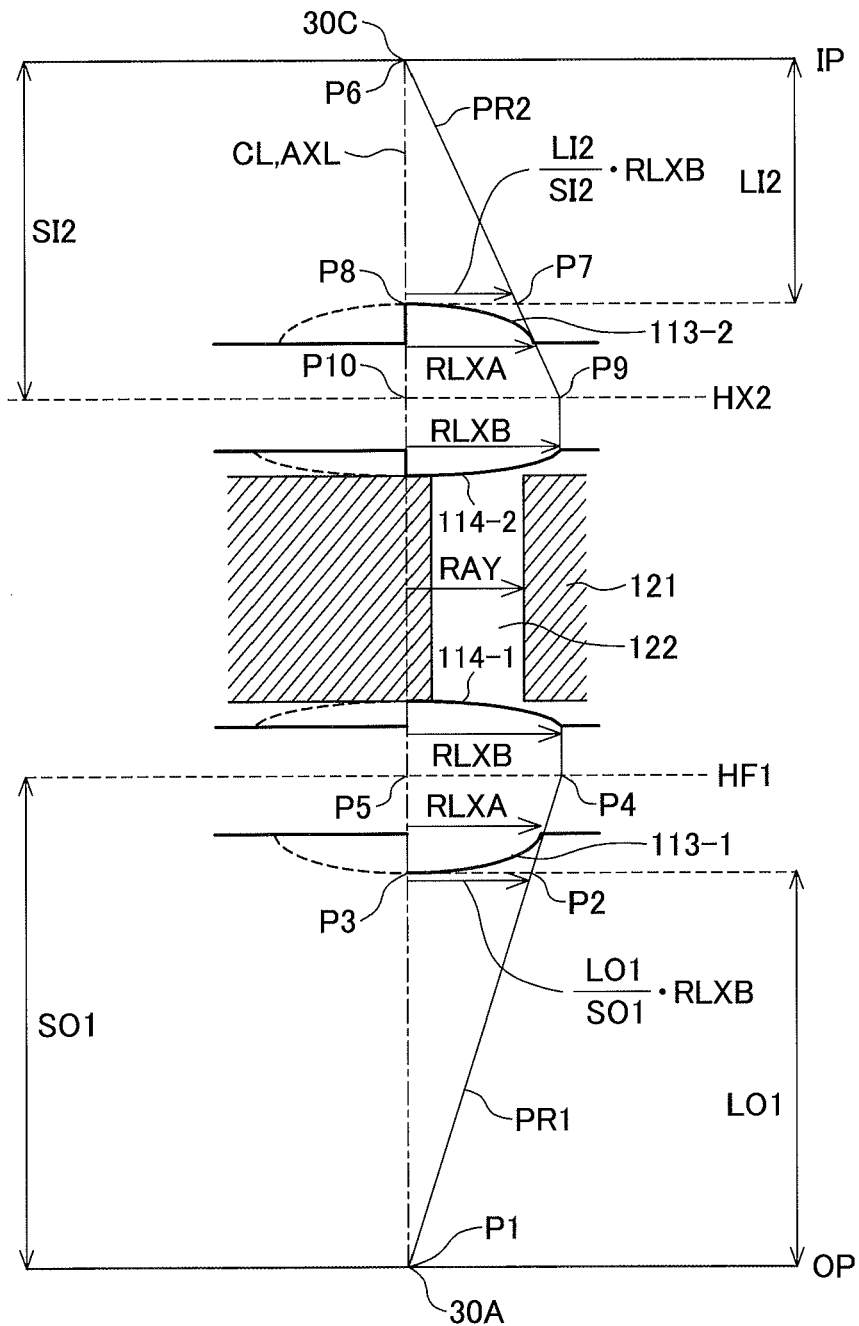

FIG. 20 shows a plan view of a first lens strip 111-1. FIGS. 21 and 22 show sectional views of the lens unit in the sagittal plane along line A-A in FIG. 20, and indicate the object plane OP and image plane IP.

Each first microlens 112-1 has an outer surface 113-1 facing toward the object plane and an inner surface 114-1 facing toward the image plane. Each second microlens 112-2 has an inner surface 114-2 facing toward the object plane and an outer surface 113-2 facing toward the image plane.

The shape of the outer surface 113-1 in the XY plane is a circle of radius RLXA truncated in the Y direction by two parallel lines extending in the X direction, at distances RLY (<RLXA) from the center of the circle, and truncated in the X direction by a line passing through the center of the circle in the Y direction, parallel to the row of the microlenses. The outer surface 113-1 is RLXA wide in the X direction in the sagittal plane and RLY×2 long in the Y direction in the meridional plane.

The shape of the inner surface 114-1 in the XY plane is a circle of radius RLXB similarly truncated in the Y direction by two parallel lines extending in the X direction, at distances RLY (<RLXB) from the center of the circle, and truncated in the X direction by a line passing through the center of the circle in the Y direction, parallel to the row of the microlenses. The inner surface 114-1 is RLXB wide in the X direction in the sagittal plane and RLY×2 long in the Y direction in the meridional plane.

In the drawings, both outer surfaces 113-1, 113-2 have the same shape and both inner surfaces 114-1, 114-2 have the same shape, but outer surface 113-1 and outer surface 113-2 may have different shapes, and inner surface 114-1 and inner surface 114-2 may have different shapes.

In the first microlens 112-1 shown in FIGS. 21 and 22, the outer surface 113-1 is narrower than the inner surface 114-1 in the X direction in the sagittal plane. In the second microlens 112-2, the outer surface 113-2 is narrower than the inner surface 114-2 in the X direction in the sagittal plane. The radius RLXA of the outer surfaces 113-1, 113-2 is smaller than the radius RLXB of the inner surfaces 114-1, 114-2.

Each first microlens 112-1 may have, for example, the shape of one half of a first microlens 12-1 in the second embodiment, and each second microlens 112-2 may have, for example, the shape of one half of a second microlens 12-2 in the second embodiment, these shapes being obtained through bisection of the first and second microlenses 12-1, 12-2 by the YZ plane.

In FIG. 22, HX1 represents the sagittal principal plane of hypothetical parallel rays incident on the inner surface 114-1 of the first microlens 112-1, propagating in the sagittal plane toward the object plane OP. Among such rays, PR1 represents a peripheral ray incident on the inner surface 114-1 at its outermost edge. P1 represents the position where peripheral ray PR1 meets the optical axis AXL, which is also the position of an object 30A in the object plane OP. P3 represents the apex of the outer surface 113-1. P2 represents the position where a plane tangent to the outer surface 113-1 at the apex P3 meets peripheral ray PR1. P4 represents the position where peripheral ray PR1 meets the sagittal principal plane HX1. P5 represents the position where the optical axis AXL meets the sagittal principal plane HX1.

Triangle P1P2P3 is similar to triangle P1P4P5. If SO1 is the distance from the object 30A to the sagittal principal plane HX1 and LO1 is the distance from the object 30A to the outer surface 113-1, the length of line P2P3 is given by the following expression (12).

$$\frac{LO1}{SO1} RLXB \tag{12}$$

If peripheral ray PR1 passes through the outer surface 113-1 at its outermost edge, the width RLXA of the outer surface 113-1 in the X direction in the sagittal plane satisfies the following inequality (13).

$$\frac{LO1}{SO1} RLXB < RLXA < RLXB \tag{13}$$

In one aspect of the fourth embodiment, the width RLXA of the outer surface 113-1 of the first microlens 112-1 satisfies the condition given by the above inequality (13).

In another aspect of the fourth embodiment, when parallel rays propagating in the sagittal plane toward the object plane are incident on the inner surface 114-1 of the first microlens 112-1, a ray incident at the edge of the inner surface 114-1 passes through the edge of the outer surface 113-1.

In FIG. 22, HX2 represents the sagittal principal plane of parallel rays incident on the inner surface 114-2 of a second microlens 112-2, propagating in the sagittal plane toward the image plane IP. Among such rays, PR2 represents a hypothetical peripheral ray incident on the inner surface 114-2 at its outermost edge. P6 represents the position where peripheral ray PR2 meets the optical axis AXL; this is also the position of the image 30C in the image plane IP. P8 represents the apex of the outer surface 113-2. P7 represents the position where peripheral ray PR2 meets a plane tangent to the outer surface 113-2 at the apex P8. P9 represents the position where peripheral ray PR2 meets the sagittal principal plane HX2. P10 represents the position where the optical axis AXL meets the sagittal principal plane HX2.

Triangle P6P7P8 is similar to triangle P6P9P10. If SI2 is the distance from the sagittal principal plane HX2 to the image 30C and LI2 is the distance from the outer surface 113-2 to the image 30C, the length of line P7P8 is given by the following expression (14).

$$\frac{LI2}{SI2} RLXB \tag{14}$$

If peripheral ray PR2 passes through the outer surface 113-2 at its outermost edge, the width RLXA of the outer surface 113-2 in the sagittal plane satisfies the condition given by the following inequality (15).

$$\frac{LI2}{SI2} RLXB < RLXA < RLXB \tag{15}$$

In one aspect of the fourth embodiment, the width RLXA of the outer surface 113-2 of the second microlens 112-2 in the sagittal plane satisfies the condition given by the above inequality (15).

In another aspect of the fourth embodiment, when parallel rays propagating in the sagittal plane toward the image 30C are incident on the inner surface 114-2 of the second microlens 112-2, the ray incident at the edge of the inner surface 114-2 passes through the edge of the outer surface 113-2.

In the sagittal plane, the inner surfaces 114-1, 114-2 of the first and second microlenses 112-1, 112-2 are wider than the aperture 122 between them. More specifically, the radius RLXB of the inner surfaces 114-1, 114-2 is greater than the radius RAX of the aperture 122.

In the meridional plane, the lens unit in the fourth embodiment has the same structure as the lens unit 1 in the first embodiment.

The operation of the lens unit 1 in the sagittal plane will be described with reference to FIG. 21. Sagittal rays emitted from an LED in the LED array 300 or more generally from any object 30A in the object plane OP are collimated by the first microlens 112-1. The collimated light rays are focused by the second microlens 112-2 to an inverted image 30C on the image plane IP. For example, the image of an arrow pointing in the +X direction in the object plane OP would be an arrow pointing in the −X direction in the image plane IP. Sagittal rays from the object 30A that are not needed for image formation are blocked by the stop strip 121.

Since the image 30C is inverted in the sagittal plane and erect in the meridional plane, the image 30C is a mirror image of the object 30A that appears to have been symmetrically reflected in the meridional plane.

The fourth embodiment combines the effects of the first, second, and third embodiments.

Fifth Embodiment

Figure 23:
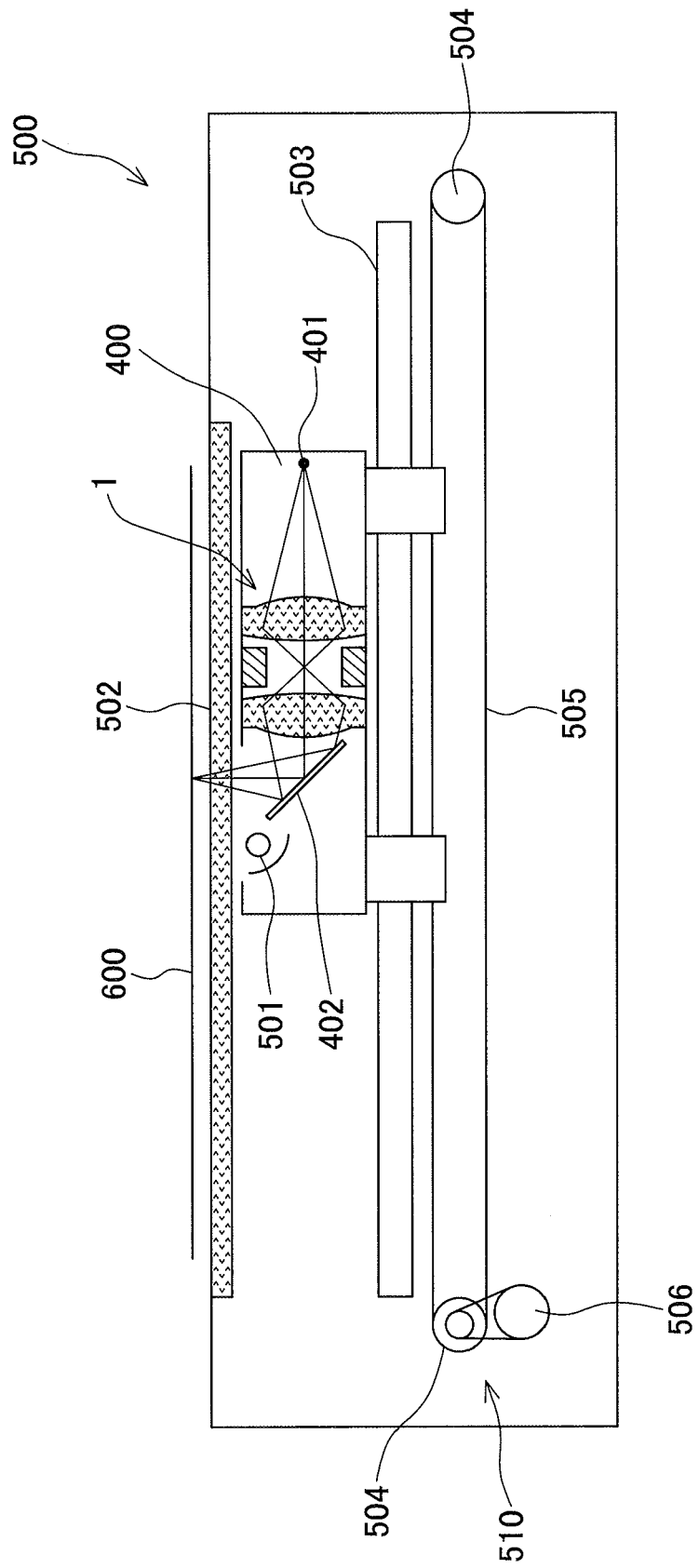
FIG. 23 is a schematic sectional view of a scanner used as a scanning device in a fifth embodiment.

Referring to FIG. 23, the fifth embodiment is a scanning device, more specifically a flatbed scanner 500, that uses the lens unit of any of the preceding embodiments to scan subject copy such as a document 600 and generate electronic data (image data) representing an image of the scanned document.

The scanner 500 includes a copyboard 502 on which the document 600 is placed, a lamp 501 for illuminating the document 600, a scanning head 400 for converting light reflected from the document 600 to an electrical signal, a rail 503 for supporting the scanning head 400 so that it can move parallel to the document 600, and a driving mechanism 510 for moving the scanning head 400 along the rail 503. The copyboard 502 is made of a material that transmits visible light. The lamp 501 is disposed in such a position that light originating from the lamp 501 passes through the copyboard 502, is reflected from the document 600, passes through the copyboard 502 again, and then enters the scanning head 400.

The driving mechanism 510 includes a motor 506, a drive belt 505 driven by the motor 506, and a pair of pulleys 504 on which the drive belt 505 is mounted. The drive belt 505 is also coupled to the scanning head 400. Rotation of the motor 506 moves the drive belt 505 around the pulleys 504, carrying the scanning head 400 along the rail 503 parallel to the document 600. The lamp 501 is mounted in the scanning head 400 and travels with the scanning head 400.

Figure 24:
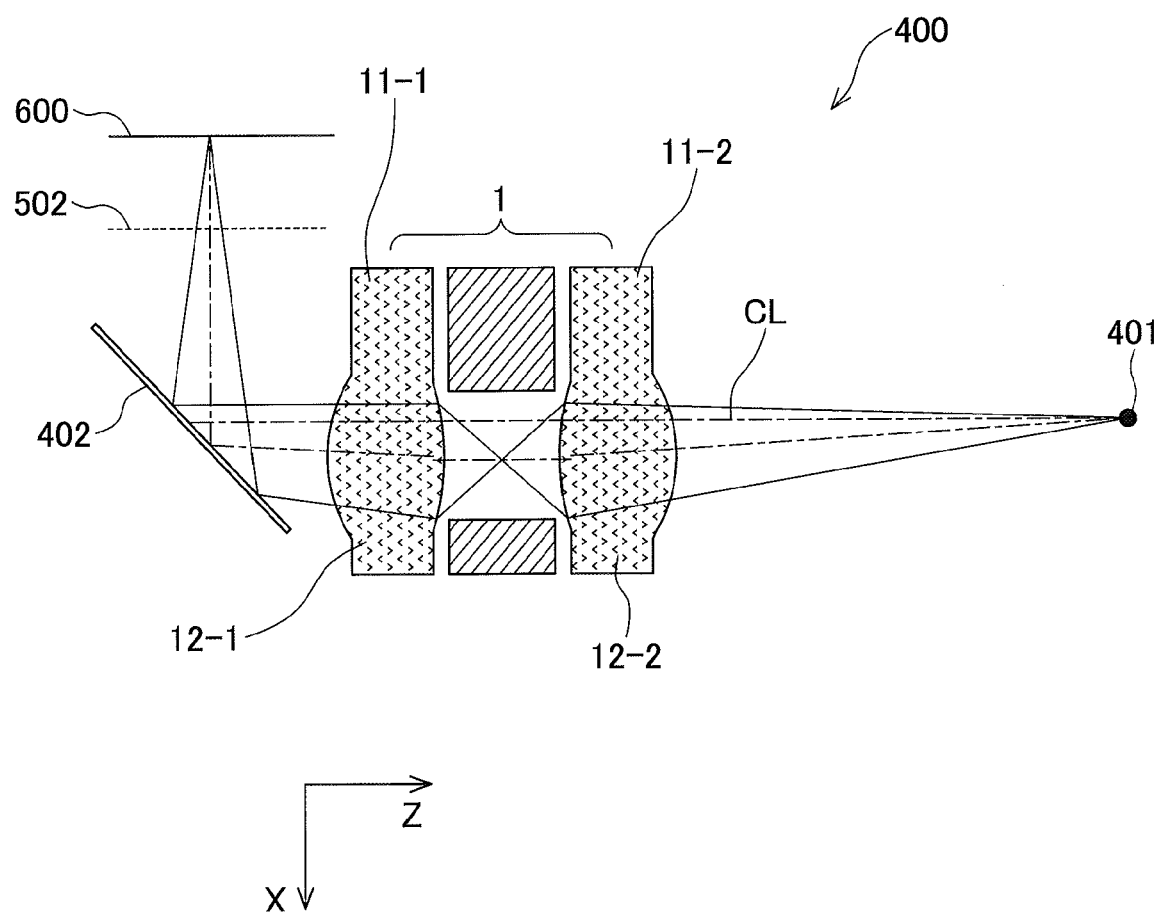
FIG. 24 is a schematic sectional view of a scanning head in the fifth embodiment.

Referring to FIG. 24, the scanning head 400 includes a lens unit 1, a line sensor 401, and a mirror 402. The mirror 402 receives light reflected from the document 600 and reflects this light to the lens unit 1, which transmits the light to the line sensor 401. The line sensor 401 is an array of photo-sensing elements that convert the light to electrical signals. The photo-sensing elements of the line sensor 401 are arranged in a substantially straight row, parallel to the copyboard 502 and orthogonal to the direction of travel of the scanning head 400.

Figure 25:
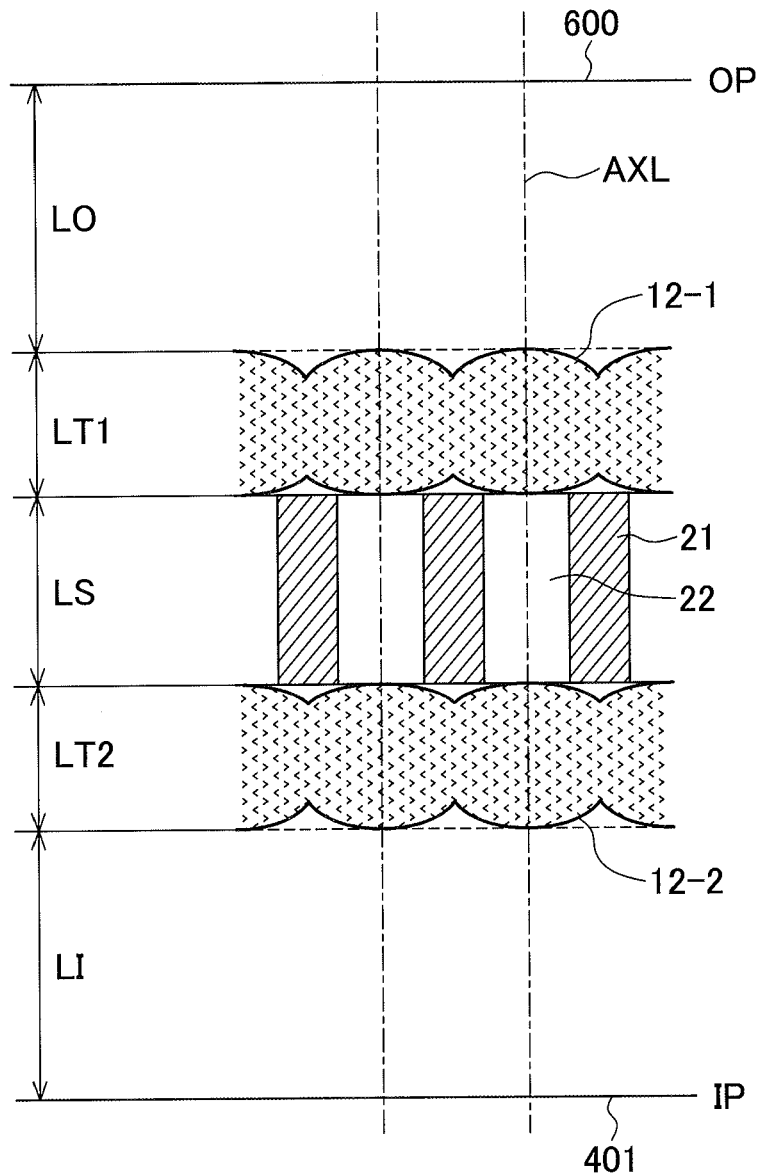
FIG. 25 is a schematic sectional view of the lens unit in the fifth embodiment.

Referring to FIG. 25, the lens unit 1 is positioned so that its object plane OP coincides with the surface of the document 600 and its image plane IP coincides with the light incidence surface of the line sensor 401. The lens unit 1 is shown as having the configuration in the first embodiment, including a first lens strip 11-1 with a plurality of first microlenses 12-1, a second lens strip 11-2 with a plurality of second microlenses 12-2, and a stop strip 21 with a plurality of apertures 22. The arrays of first microlenses 12-1 and second microlenses 12-2 are parallel to the array of photo-sensing elements of the line sensor 401.

An exemplary line sensor 401 having a resolution of 1200 dpi has 1200 photo-sensing elements per inch. The spacing between the photo-sensing elements is 0.02117 mm.

The operation of the scanner 500 will be described with reference to FIGS. 23 to 25.

Light rays originating from the lamp 501 pass through the copyboard 502, are reflected from the document 600, pass through the copyboard 502 again, and enter the scanning head 400. Driven by the motor 506, the drive belt 505 moves the scanning head 400 and lamp 501 along the rail 503 to scan the entire document 600, line by line.

Light rays entering the scanning head 400 are reflected by the mirror 402 and focused by the lens unit 1 to form an image of the scanned line of the document 600 on the line sensor 401. The line sensor 401 converts the image to a series of electrical signals.

When subject copy was scanned by an actual scanner having the structure described above, electrical signals representing an image substantially identical to the subject copy were obtained. The subject copy was a printed medium on which dots were printed in alternate dot positions spaced at intervals of 0.02117 mm over the entire printed area, with a resolution of 1200 dpi.

Due to the structure of the lens unit 1, the scanner in this embodiment can produce a faithful image of subject copy with a reduced amount of illumination light.

Applications of the novel lens unit are not limited to the LED printer and flatbed scanner shown in the embodiments above. The lens unit is useful in any type of electrophotographic printer, and in a wide variety of scanning devices that generate electrical signals representing optical images. Exemplary scanning devices include image communication devices, biometric authentication devices, measuring devices, and numerous other input-output devices with line sensors incorporating any type of sensing elements or switching elements that respond to light.

Those skilled in the art will recognize that further variations are possible within the scope of the invention, which is defined in the appended claims.

What is claimed is:

1. A lens unit for focusing light from an object plane onto an image plane, the lens unit comprising:
   a first lens array including a plurality of lenses with mutually substantially parallel optical axes, the lenses in the first lens array being aligned in a first direction substantially orthogonal to their optical axes, the optical axes extending in a second direction orthogonal to the first direction, the first and second directions both being orthogonal to a third direction; and
   a second lens array including a plurality of lenses with mutually substantially parallel optical axes, the lenses in the second lens array being aligned in the first direction, the optical axes of the lenses in the second lens array coinciding with the optical axes of corresponding ones of the lenses in the first lens array; wherein
   in each of a plurality of pairs of lenses including a first lens in the first lens array and a second lens in the second lens array with mutually coincident optical axes, the first lens collimates incident light rays originating from the object plane and propagating in a first plane, and the second lens focuses the collimated light rays onto the image plane,
   the first plane substantially including the optical axes of the first lens and the second lens and being parallel to the third direction,
   the first direction being parallel to a second plane substantially including the optical axes of the first lens and the second lens.

2. The lens unit of claim 1, wherein the first lens or the second lens is wider in the third direction than in the first direction.

3. The lens unit of claim 1, wherein the first and second lenses have sectional shapes with a greater radius of curvature in the first plane than in the second plane.

4. The lens unit of claim 1, further comprising a stop member for limiting light incident on the second lens array from the first lens array, the stop member having a plurality of apertures each allowing light from the corresponding lens in the first lens array to pass through to the corresponding lens in the second lens array.

5. The lens unit of claim 1, wherein the first lens has a focal length, with respect to parallel rays in the first plane, substantially equal to a distance from the first lens to the object plane.

6. The lens unit of claim 1, wherein the second lens has a focal length, with respect to parallel rays in the first plane, substantially equal to a distance from the second lens to the image plane.

7. The lens unit of claim 1, wherein the focal length of the first lens with respect to parallel rays in the first plane is greater than the focal length of the first lens with respect to parallel rays in the second plane.

8. The lens unit of claim 1, wherein the focal length of the second lens with respect to parallel rays in the first plane is greater than the focal length of the second lens with respect to parallel rays in the second plane.

9. The lens unit of claim 1, wherein mutually adjacent lenses in the first lens array or mutually adjacent lenses in the second lens array are in mutual contact with no intervening gap.

10. The lens unit of claim 1, wherein the first lens has a first surface facing toward the object plane and a second surface facing toward the image plane, the first surface being narrower, in the third direction, than the second surface.

11. The lens unit of claim 1, wherein the second lens has a first surface facing toward the image plane and a second surface facing toward the object plane, the first surface being narrower, in the third direction, than the second surface.

12. The lens unit of claim 11, wherein the first lens has a first surface facing toward the object plane and a second surface facing toward the image plane, the second surface being wider in the third direction than the first direction.

13. The lens unit of claim 11, wherein the second surface of the second lenses is wider in the third direction than in the first direction.

14. The lens unit of claim 1, wherein the lenses in the first lens array are apportioned among a first row of lenses and a second row of lenses, the first and second rows of lenses both extending in the first direction, and the lenses in the second lens array are apportioned among a third row of lenses and a fourth row of lenses, the third and fourth rows of second lenses both extending in the first direction.

15. The lens unit of claim 14, wherein the lenses in the first row of lenses have first shapes, the lenses in the second row of lenses have second shapes, the lenses in the third row of lenses have third shapes, and the lenses in the fourth row of lenses have fourth shapes, the first and second shapes being mutually substantially symmetrical by rotation through 180 degrees in a third plane orthogonal to the second direction, the third and fourth shapes being mutually substantially symmetrical by rotation through 180 degrees in a fourth plane orthogonal to the second direction.

16. The lens unit of claim 14, further comprising a stop member for limiting light incident on the second lens array from the first lens array, the stop member having a plurality of apertures each allowing light from the corresponding lens in the first lens array to pass through to the corresponding lens in the second lens array but each blocking light propagating on the optical axes of the lenses.

17. An LED head comprising:
the lens unit of claim 1; and
an LED array including a plurality of light emitting elements that emit the incident light rays focused by the lens unit.

18. An exposure device comprising:
the lens unit of claim 1; and
a light emitting array including a plurality of light emitting elements that emit the incident light rays focused by the lens unit.

19. An image forming device comprising:
the lens unit of claim 1;
an image carrier; and
an exposure device using the lens unit to illuminate the image carrier, thereby forming a latent electrostatic image on the image carrier.

20. An image scanning device comprising:
the lens unit of claim 1;
an illumination device for illuminating subject copy in the object plane of the lens unit; and
a scanning head using the lens unit to convert light reflected from the subject copy to an electrical signal.

* * * * *